(12) United States Patent
Bhuwania et al.

(10) Patent No.: US 11,992,814 B2
(45) Date of Patent: May 28, 2024

(54) ASYMMETRIC MODIFIED CARBON MOLECULAR SIEVE HOLLOW FIBER MEMBRANES HAVING IMPROVED PERMEANCE

(71) Applicants: Georgia Tech Research Corporation, Atlanta, GA (US); AIR LIQUIDE ADVANCED TECHNOLOGIES U.S., LLC, Newark, DE (US)

(72) Inventors: Nitesh Bhuwania, Atlanta, GA (US); William John Koros, Atlanta, GA (US); Paul Jason Williams, Richmond, TX (US)

(73) Assignees: GEORGIA TECH RESEARCH CORPORATION, Atlanta, GA (US); AIR LIQUIDE ADVANCED TECHNOLOGIES U.S., LLC, Newark, DE (US)

( * ) Notice: Subject to any disclaimer, the term of this patent is extended or adjusted under 35 U.S.C. 154(b) by 148 days.

(21) Appl. No.: 17/407,465

(22) Filed: Aug. 20, 2021

(65) Prior Publication Data

US 2021/0379538 A1 Dec. 9, 2021

Related U.S. Application Data

(63) Continuation of application No. 15/812,025, filed on Nov. 14, 2017, now Pat. No. 11,123,693, which is a continuation of application No. 14/501,884, filed on Sep. 30, 2014, now Pat. No. 9,815,030.

(60) Provisional application No. 61/884,548, filed on Sep. 30, 2013.

(51) Int. Cl.
| | | |
|---|---|---|
| *B01D 71/02* | (2006.01) | |
| *B01D 53/22* | (2006.01) | |
| *B01D 67/00* | (2006.01) | |
| *B01D 69/08* | (2006.01) | |

(52) U.S. Cl.
CPC ......... *B01D 71/021* (2013.01); *B01D 53/228* (2013.01); *B01D 67/0067* (2013.01); *B01D 69/08* (2013.01); *B01D 2323/12* (2013.01); *B01D 2325/20* (2013.01); *Y02C 20/20* (2013.01)

(58) Field of Classification Search
CPC .......... C08L 79/04; C08L 79/06; C08L 79/08; C08L 2666/44; B01D 2323/12; B01D 2325/20; B01D 53/228; B01D 67/0067; B01D 69/08; B01D 71/021
See application file for complete search history.

(56) References Cited

U.S. PATENT DOCUMENTS

| | | |
|---|---|---|
| 2009/0126570 A1 | 5/2009 | Liu et al. |
| 2011/0316181 A1 | 12/2011 | Liu et al. |
| 2013/0152793 A1 | 6/2013 | Bhuwania et al. |

FOREIGN PATENT DOCUMENTS

| | | |
|---|---|---|
| JP | 2000342944 | 12/2000 |
| JP | 2002355538 | 12/2002 |
| WO | 2012148563 | 11/2012 |

OTHER PUBLICATIONS

International Search Report and Written Opinion for PCT/US2014/058329, dated Dec. 24, 2014, 13 pages.
European Communication for EP14848025, dated Jan. 13, 2020, 6 pages.
"Modification of carbon molecular sieve membrane structure by self-assisted deposition carbon segment for gas separation", Hui-Hsin Tseng, et al., Journal of Membrane Science 389, pp. 223-233.

*Primary Examiner* — Ana L. Woodward
(74) *Attorney, Agent, or Firm* — McAndrews, Held & Malloy, Ltd.

(57) ABSTRACT

The present invention provides an asymmetric modified CMS hollow fiber membrane having improved gas separation performance properties and a process for preparing an asymmetric modified CMS hollow fiber membrane having improved gas separation performance properties. The process comprises treating a polymeric precursor fiber with a solution containing a modifying agent prior to pyrolysis. The concentration of the modifying agent in the solution may be selected in order to obtain an asymmetric modified CMS hollow fiber membrane having a desired combination of gas permeance and selectivity properties. The treated precursor fiber is then pyrolyzed to form an asymmetric modified CMS hollow fiber membrane having improved gas permeance.

20 Claims, 15 Drawing Sheets

ASYMMETRIC MODIFIED CARBON MOLECULAR SIEVE HOLLOW FIBER MEMBRANES HAVING IMPROVED PERMEANCE

The present application is a continuation of U.S. Non-provisional application Ser. No. 15/812,025, filed on Nov. 14, 2017, which is a continuation of U.S. Non-provisional application Ser. No. 14/501,884, filed on Sep. 30, 2014, which claims priority under 35 U.S.C. § 119(e) to U.S. Provisional Application No. 61/884,548, filed on Sep. 30, 2013.

BACKGROUND OF THE INVENTION

1. Field of the Invention

The present invention relates generally to modified carbon molecular sieve (modified CMS) membranes, and more particularly to asymmetric modified CMS hollow fiber membranes.

2. Description of the Related Art

Carbon molecular sieve (CMS) membranes have shown great potential for the separation of gases, such as for the removal of carbon dioxide ($CO_2$) and other acid gases from natural gas streams. Asymmetric CMS hollow fiber membranes are preferred for large scale, high pressure applications.

Asymmetric hollow fiber membranes have the potential to provide the high fluxes required for productive separation due to the reduction of the separating layer to a thin integral skin on the outer surface of the membrane. The asymmetric hollow morphology, i.e. a thin integral skin supported by a porous base layer or substructure, provides the fibers with strength and flexibility, making them able to withstand large transmembrane driving force pressure differences. Additionally, asymmetric hollow fiber membranes provide a high surface area to volume ratio.

Asymmetric CMS hollow fiber membranes comprise a thin and dense skin layer supported by a porous substructure. Asymmetric polymeric hollow fibers, or precursor fibers, are conventionally formed via a dry-jet/wet-quench spinning process, also known as a dry/wet phase separation process or a dry/wet spinning process. The precursor fibers are then pyrolyzed at a temperature above the glass transition temperature of the polymer to prepare asymmetric CMS hollow fiber membranes.

The polymer solution used for spinning of an asymmetric hollow fiber is referred to as dope. During spinning, the dope surrounds an interior fluid, which is known as the bore fluid. The dope and bore fluid are coextruded through a spinneret into an air gap during the "dry-jet" step. The spun fiber is then immersed into an aqueous quench bath in the "wet-quench" step, which causes a wet phase separation process to occur. After the phase separation occurs, the fibers are collected by a take-up drum and subjected to a solvent exchange process.

The solvent exchange process is an extremely important step in the membrane fabrication process. If the porous precursor fibers contain water at the time they are subjected to high temperatures, for instance during drying or pyrolysis, removal of the water causes significant changes to the structure and properties of the fiber and of the resulting CMS membrane. The high capillary forces associated with removal of water within the small radii of the pores close to the skin cause a densification of the structure in this region, which results in a less permeable membrane. To prevent this, the solvent exchange process replaces the water that is present in the porous substructure of the precursor fiber with a fluid having a lower surface tension.

A conventional solvent exchange process involves two or more steps, with each step using a different solvent. The first step or series of steps involves contacting the precursor fiber with one or more solvents that are effective to remove the water in the membrane. This generally involves the use of one or more water-miscible alcohols that are sufficiently inert to the polymer. The aliphatic alcohols with 1-3 carbon atoms, i.e. methanol, ethanol, propanol, isopropanol, and combinations of the above, are particularly effective as a first solvent. The second step or series of steps involves contacting the fiber with one or more solvents that are effective to replace the first solvent with one or more volatile organic compounds having a low surface tension. Among the organic compounds that are useful as a second solvent are the $C_5$ or greater linear or branched-chain aliphatic alkanes.

The solvent exchange process typically involves soaking the precursor fibers in a first solvent for a first effective time, which can range up to a number of days, and then soaking the precursor fibers in a second solvent for a second effective time, which can also range up to a number of days. Where the precursor fibers are produced continuously, such as in a commercial capacity, a long precursor fiber may be continuously pulled through a series of contacting vessels, where it is contacted with each of the solvents. The solvent exchange process is generally performed at room temperature.

The precursor fibers are then dried by heating to temperature above the boiling point of the final solvent used in the solvent exchange process and subjected to pyrolysis in order to form asymmetric CMS hollow fiber membranes.

The choice of polymer precursor, the formation and treatment of the precursor fiber prior to pyrolysis, and the conditions of the pyrolysis all influence the performance properties of an asymmetric CMS hollow fiber membrane.

Important properties of asymmetric CMS hollow fiber membranes include permeance and selectivity. Permeance measures the pressure-normalized flux of a given compound while selectivity measures the ability of one gas to permeate through the membrane versus a different gas. These properties, and the methods by which asymmetric CMS hollow fiber membranes may be tested to determine these properties, are described in more detail in, for example, U.S. Pat. Nos. 6,565,631 and 8,486,179, the contents of both of which are hereby incorporated by reference.

Though asymmetric CMS hollow fiber membranes exhibit encouraging selectivities, they exhibit lower permeance after pyrolysis than would be expected based on the permeability increase in corresponding dense films before and after pyrolysis of the same precursor polymer. The lower than expected permeance is thought to be caused, at least in part, by a phenomenon known as substructure morphology collapse.

As described in U.S. patent application Ser. No. 13/666,370, the contents of which are hereby incorporated by reference, substructure morphology collapse occurs when intensive heat-treatment during pyrolysis relaxes the polymer chains, causing their segments to move closer to one another and collapsing the pores in the substructure. This substructure morphology collapse results in an increased actual membrane separation thickness, and thus a drop in permeance. Because of the permeance drop, the advantage of having a high transport flux in an asymmetric fiber is lost significantly.

In U.S. patent application Ser. No. 13/666,370, Bhuwania et al. described a method for treating precursor fibers in order to limit the substructure collapse that occurs during pyrolysis. Bhuwania et al. showed that by soaking the precursor fibers in a chemical modifying agent, such as vinyl trimethoxy silane (VTMS), before pyrolysis, asymmetric CMS hollow fibers having an increased permeance could be formed. Without being bound by any theory, Bhuwania et al. described that the chemical modifying agent thermally and/or physically stabilizes the precursor fiber prior to pyrolysis.

It has now surprisingly been found that by contacting a precursor fiber with a solution containing the modifying agent at a concentration of less than 100%, the permeance of the resulting asymmetric modified CMS hollow fiber membrane can be increased to a degree well beyond that which is achieved by soaking the precursor fiber in the chemical modifying agent alone, as was described in U.S. patent application Ser. No. 13/666,370, without having an adverse effect on the selectivity of the modified CMS hollow fiber membrane.

SUMMARY OF THE INVENTION

It is an object of at least one embodiment of the present invention to provide a process for preparing an asymmetric modified CMS hollow fiber membrane having improved gas separation performance properties by treating a polymeric precursor fiber with a solution containing a modifying agent prior to pyrolysis. The concentration of the modifying agent in the solution may be selected in order to obtain an asymmetric modified CMS hollow fiber membrane having a desired combination of gas permeance and selectivity properties. The precursor fiber is then preferably contacted with a moisture-containing atmosphere. The treated precursor fiber is pyrolyzed to form an asymmetric modified CMS hollow fiber membrane having improved gas permeance.

For example, the concentration of the modifying agent in the solution may be selected to obtain an asymmetric modified CMS hollow fiber membrane having a gas permeance property that is at least a 400% increase over an equivalent asymmetric CMS hollow fiber membrane that was not subjected to treatment with the modifying agent. The concentration of the modifying agent in the solution may also be selected to obtain an asymmetric modified CMS hollow fiber membrane that is useful for the separation of particular components within a gas stream. For example, the concentration of the modifying agent may be selected to obtain an asymmetric modified CMS hollow fiber membrane that is useful for the separation of acid gases, such as $CO_2$ and $H_2S$, from a hydrocarbon-containing gas stream such as natural gas. The concentration of the modifying agent may also be selected to obtain an asymmetric modified CMS hollow fiber membrane that is configured for the separation of particular gases, including but not limited to $CO_2$ and $CH_4$, $H_2S$ and $CH_4$, $CO_2/H_2S$ and $CH_4$, $CO_2$ and $N_2$, $O_2$ and $N_2$, $N_2$ and $CH_4$, He and $CH_4$, $H_2$ and $CH_4$, $H_2$ and $C_2H_4$, ethylene and ethane, propylene and propane, and ethylene/propylene and ethane/propane, each of which may be performed within a gas stream comprising additional components.

It is also an object of at least one embodiment of the present invention to provide a process for preparing an asymmetric modified CMS hollow fiber membrane having an improved gas permeance property by treating a precursor fiber with a solution containing a modifying agent, in which the modifying agent is present in the solution at a concentration between about 1 and about 90 percent by weight, and then pyrolyzing the treated fibers to form an asymmetric modified CMS hollow fiber membrane.

In another aspect, it is an object of at least one embodiment of the present invention to provide a process for forming an asymmetric modified CMS hollow fiber membrane in which at least one of the solvent exchange materials with which the precursor fiber is contacted prior to pyrolysis contains a modifying agent in an amount that is effective to improve the gas permeance of the asymmetric modified CMS hollow fiber membrane. In the preparation of an asymmetric CMS hollow fiber membrane, the polymeric hollow fiber is spun and then immersed in an aqueous bath—a process known as the dry-jet, wet-quench method. Then, in a solvent exchange step, the fiber is contacted with an organic compound having a low surface tension, such as n-hexane, which enters the pores of the fiber. By replacing the organic compound of the conventional solvent exchange process with a solution comprising the organic compound and a modifying agent, it has now been found that pyrolysis of the treated precursor fibers produces asymmetric modified CMS hollow fiber membranes having improved gas permeance properties.

Accordingly, at least one embodiment of the present invention is directed to a process for forming an asymmetric modified CMS hollow fiber membrane that includes forming an asymmetric hollow polymer fiber, contacting the hollow polymer fiber with a solvent exchange material comprising a modifying agent in an amount effective to improve the gas permeance of the asymmetric CMS hollow fiber membrane, and pyrolyzing the hollow polymer fiber to form an asymmetric modified CMS hollow fiber membrane. At least another embodiment of the present invention is directed to a process for preparing an asymmetric polymer precursor fiber by the dry-jet, wet-quench method, the improvement comprising during the solvent exchange step, contacting the fiber with a modifying agent that is effective to increase the gas permeance of the asymmetric modified CMS hollow fiber membrane that is formed upon pyrolysis of the asymmetric polymer precursor fiber.

It is another object of at least one embodiment of the present invention to provide an asymmetric modified CMS hollow fiber membrane having a morphology stabilizer within at least one of its pores. Treatment of a polymer precursor fiber with a modifying agent prior to pyrolysis causes a sol-gel reaction to take place between the modifying agent and the moisture contained within the pores of the polymeric precursor fiber. During pyrolysis, the sol-gel is converted to a morphology stabilizer, which acts to support the pores and restrict collapse. In at least one preferred embodiment, the morphology stabilizer comprises a silicon-containing compound, such as one containing siloxane bridges. In at least one embodiment, the amount of morphology stabilizer within the asymmetric modified CMS hollow fiber membrane can be generally measured by elemental analysis. Preferably, the asymmetric modified CMS hollow fiber membrane contains between about 0.1 and about 10 mol % of an indicating element, such as silicon.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Asymmetric Modified CMS Hollow Fiber Membranes and Morphology Stabilizers

An asymmetric modified CMS hollow fiber membrane is an asymmetric CMS hollow fiber membrane that has been treated with a modifying agent prior to pyrolysis such that substructure collapse of the fiber during pyrolysis is limited, bringing about an increase in the gas permeance of the asymmetric CMS hollow fiber membrane over one that has been prepared in the same manner but without being treated with the modifying agent.

Treatment of the precursor fiber with a modifying agent also alters the elemental makeup of the asymmetric CMS hollow fiber membrane. For example, the modifying agent may contain elements, such as silicon, metals or combinations thereof, whose presence decreases the weight percent of carbon in a modified CMS hollow fiber membrane. A modified CMS hollow fiber membrane may comprise, for instance, between about 60% and about 80% by weight carbon, compared with a conventional CMS hollow fiber membrane, which typically comprises at least 80% by weight carbon. A modified CMS hollow fiber membrane is not defined by the amount or percentage of carbon in its elemental makeup and does not require a particular minimum amount or percentage of carbon to be present.

Figure 1:
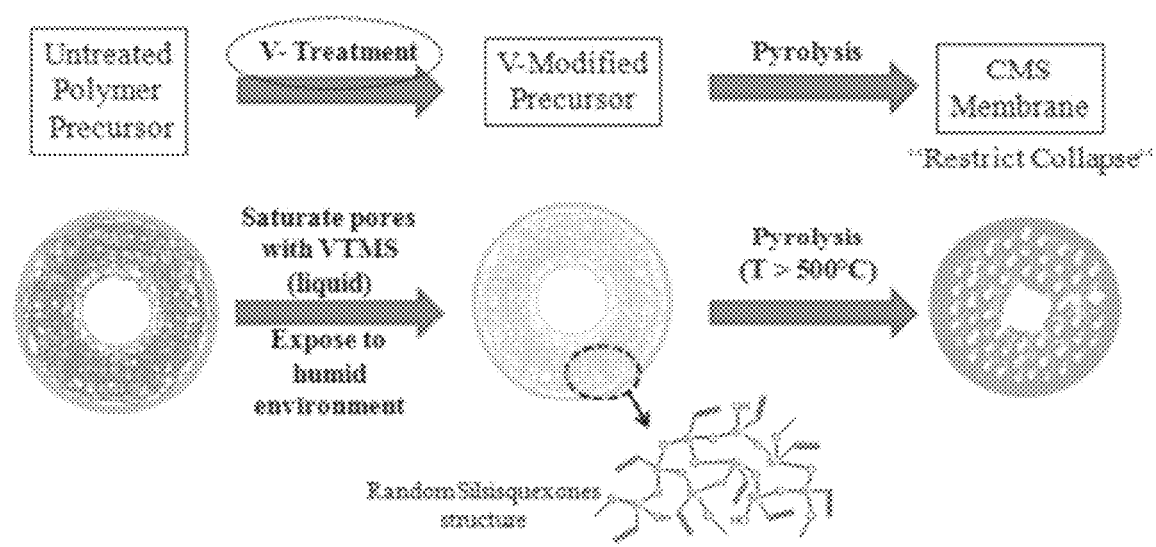
FIG. 1 is an illustration of an exemplary precursor fiber treatment process according to various embodiments of the present invention.
Figure 2:
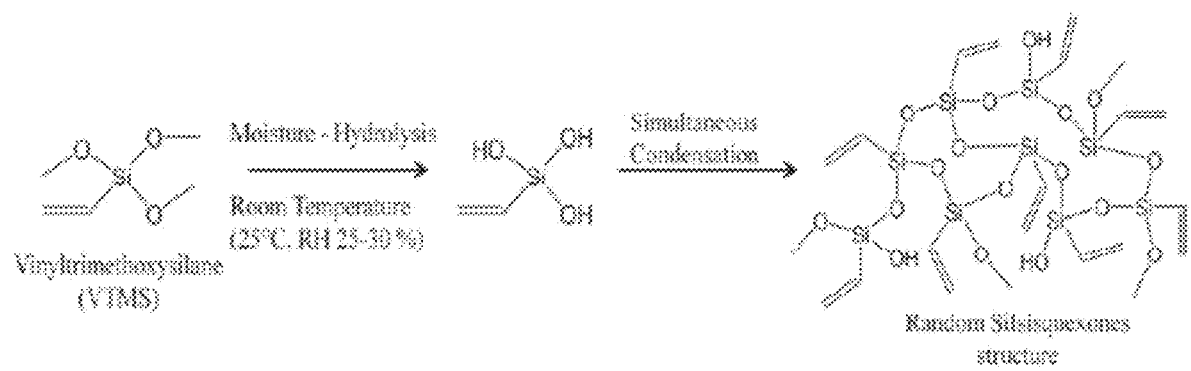
FIG. 2 is an illustration of a reaction of the type that is believed to take place when a precursor fiber is contacted with a modifying agent according to various embodiments of the present invention.

It has now been found that the modifying agent need not react with the polymer precursor fiber itself, but rather that the modifying agent may react with moisture that is present in the pores of a precursor fiber or molecularly sorbed between the polymer chain segments. It is believed that the modifying agent reacts with the moisture that is present in the pores of the precursor fiber by a sol-gel reaction process to form a solid morphology stabilizer structure. FIG. 1 illustrates the two steps of the contemplated sol-gel reaction, in which vinyltrimethoxysilane (VTMS), a preferred modifying agent, is converted into a morphology stabilizer within the pores of an asymmetric hollow fiber. In a first step, the modifying agent undergoes hydrolysis and polycondensation reactions to form a chain-like network. The first step is illustrated, for example, in FIG. 2, which shows the contemplated hydrolysis and condensation reactions of vinyltrimethoxysilane (VTMS) to form a chain-like network. It is believed that the first step, i.e. the reaction of the modifying agent to form a chain-like network, is brought about by contacting a precursor fiber with the modifying agent, such as by soaking the precursor fiber in a solution containing the modifying agent, and then contacting the precursor fiber with moisture, such as by placing the fiber under a moist atmosphere. In a second step, the chain-like network is converted to a solid structure. As illustrated in FIG. 1, it is believed that the second step occurs during pyrolysis of the precursor fiber.

The result of the reaction is the formation of a morphology stabilizer. The term morphology stabilizer as used herein refers to the residue of a modifying agent that acts to restrict pore collapse during pyrolysis and that resides in the porous substructure of the asymmetric modified CMS hollow fiber. The morphology stabilizer is a glassy structure that acts as a sort of scaffolding within a pore, thereby preventing the collapse of the pore. In some embodiments, the morphology stabilizer may be porous. Where the morphology stabilizer is porous, such as a morphology stabilizer comprising mesopores, its interference with the flow of gas through the modified CMS hollow fiber membrane is reduced.

The formation of a morphology stabilizer through a sol-gel reaction process, as well as the relationship between the morphology stabilizer and the modified CMS hollow fiber membrane, has been discovered and confirmed through a number of studies.

Example 1

Matrimid® 5218 precursor fibers were soaked in pure VTMS at room temperature for about twelve hours. The fibers were then removed and placed into a glove bag saturated with air of relative humidity at about 100%. After about forty-eight hours, the fibers were removed from the glove bag and dried under vacuum at 150° C. for about twelve hours. A portion of the treated Matrimid® 5218 precursor fibers were reserved for testing. The remainder of the treated Matrimid® 5218 precursor fibers were pyrolyzed under an atmosphere of ultra-high purity argon (~99.9%) at a maximum pyrolysis temperature of about 650° C. The fibers were held at the maximum pyrolysis temperature for about two hours.

Figure 5A:
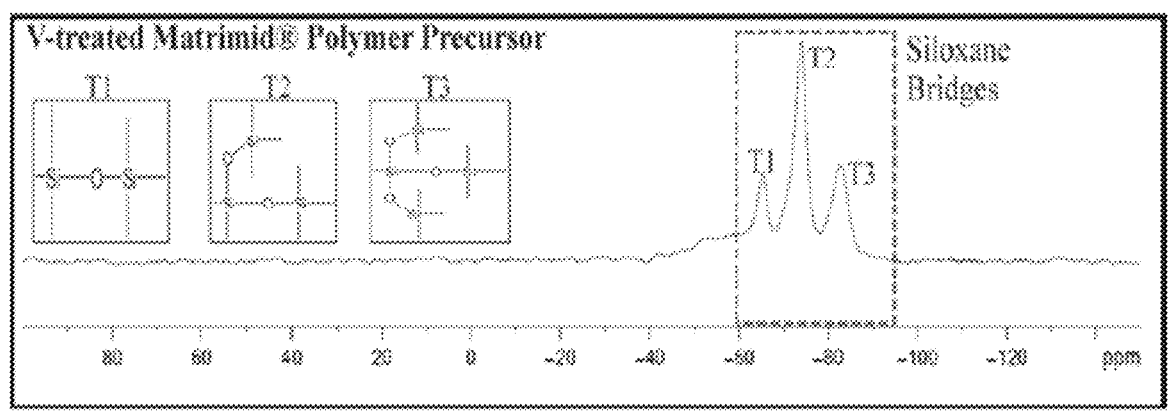
FIG. 5A shows test results of $^{29}Si$ solid state nuclear magnetic resonance (NMR) demonstrating the presence of siloxane bridges in a precursor fiber treated according to embodiments of the present invention.
Figure 5B:
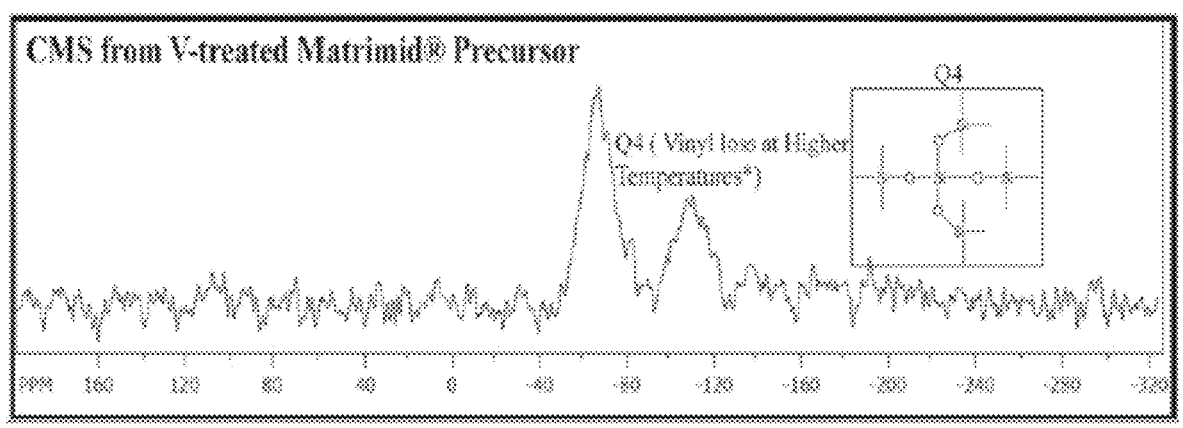
FIG. 5B shows test results of $^{29}Si$ solid state nuclear magnetic resonance (NMR) demonstrating the presence of siloxane bridges in an asymmetric carbon molecular sieve hollow fiber treated according to embodiments of the present invention.

Both the treated Matrimid® 5218 precursor fibers, i.e. the pre-pyrolysis fibers, and the modified CMS hollow fibers, i.e. the post-pyrolysis fibers, were tested by $^{29}Si$ solid state nuclear magnetic resonance (NMR). After treatment with VTMS, the Matrimid® 5218 precursor fibers exhibited peaks that were indicative of siloxane bonds, also sometimes referred to as siloxane bridges. These siloxane bridges are indicative of the hydrolysis and condensation of the VTMS via a sol-gel reaction. After being subjected to pyrolysis, the CMS hollow fibers also exhibited peaks that were indicative of siloxane bridges. $^{29}Si$ solid state NMR demonstrates that the asymmetric modified CMS hollow fibers comprise a residue of the sol-gel reaction. The results of this study are shown in FIGS. 5A and 5B.

Example 2

Matrimid® 5218 precursor fibers were soaked in pure VTMS at room temperature for about twelve hours. The fibers were then removed and placed into a glove bag saturated with air of relative humidity at about 100%. After about forty-eight hours, the fibers were removed from the glove bag and dried under vacuum at 150° C. for about twelve hours.

Figure 6:
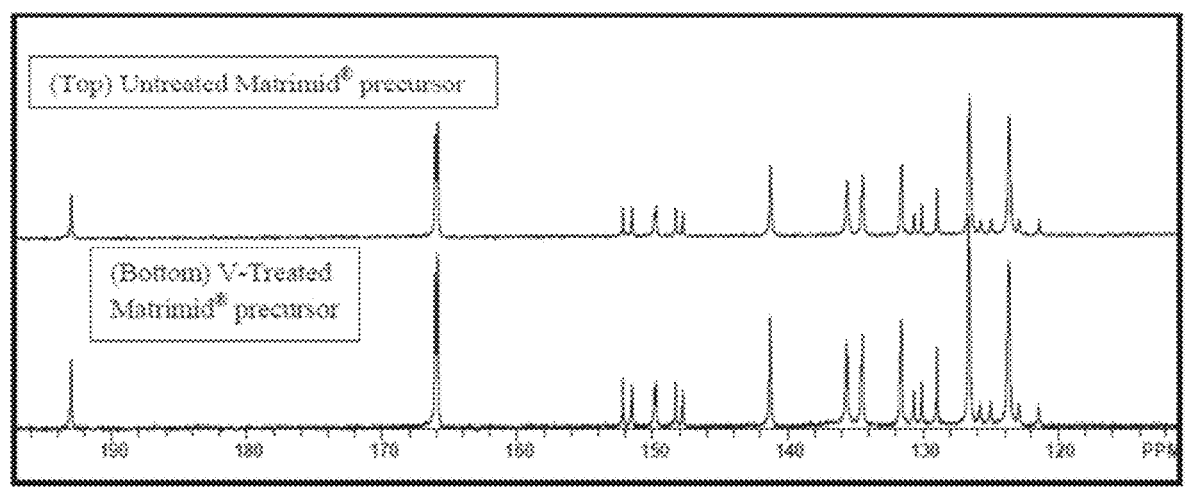
FIG. 6 shows test results of $^{13}C$ solution nuclear magnetic resonance (NMR) demonstrating that the modifying agent does not react with polymer precursor fiber.

The treated Matrimid® 5218 precursor fibers were tested by $^{13}C$ solution nuclear magnetic resonance (NMR) and the results compared against the $^{13}C$ solution nuclear magnetic resonance spectrum for untreated Matrimid® 5218 precursor fibers. The results are shown in FIG. 6. Notably, the $^{13}C$ solution NMR spectrum of the treated Matrimid® 5218 precursor fibers has no substantial difference from the $^{13}C$ solution NMR spectrum of the Matrimid® 5218 precursor fibers that were not contacted with the VTMS modifying agent. These results indicate that the modifying agent does not react with the Matrimid® 5218 precursor fiber, i.e. that the sol-gel reaction did not occur between the modifying agent and the polymer precursor. Rather, it was determined that the sol-gel reaction occurred between the modifying agent and moisture that is present within the pores of the Matrimid® 5218 precursor fibers.

Precursor Fibers

The asymmetric polymer precursor fiber may comprise any polymeric material that, after undergoing pyrolysis, produces a CMS membrane that permits passage of the desired gases to be separated, for example carbon dioxide and natural gas, and in which at least one of the desired gases permeates through the CMS fiber at different diffusion rate than other components. The polyimides are preferred polymers precursor materials. Suitable polyimides include, for example, Ultem® 1000, Matrimid® 5218, 6FDA/BPDA-DAM, 6FDA-6FpDA, and 6FDA-IPDA.

The polyimide commercially sold as Matrimid® 5218 is a thermoplastic polyimide based on a specialty diamine, 5(6)-amino-1-(4' aminophenyl)-1,3,-trimethylindane. Its structure is:

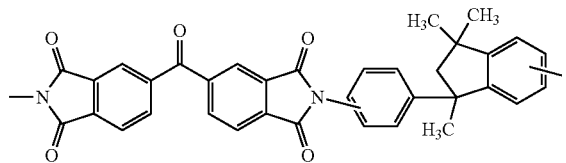

The Matrimid® 5218 polymers used in the Examples were obtained from Huntsman International LLC. 6FDA/BPDA-DAM is a polymer made up of 2,4,6-Trimethyl-1,3-phenylene diamine (DAM), 3,3,4,4-biphenyl tetracarboxylic dianhydride (BPDA), and 5,5-[2,2,2-trifluoro-1-(trifluoromethyl)ethylidene]bis-1,3-isobenzofurandione (6FDA), and having the structure:

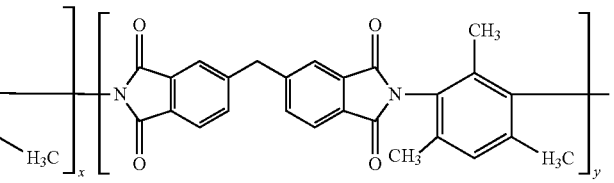

To obtain the above mentioned polymers one can use available sources or synthesize them. For example, such a polymer is described in U.S. Pat. No. 5,234,471, the contents of which are hereby incorporated by reference.

Examples of other suitable precursor polymers include polysulfones; poly(styrenes), including styrene-containing copolymers such as acrylonitrilestyrene copolymers, styrene-butadiene copolymers and styrene-vinylbenzylhalide copolymers: polycarbonates; cellulosic polymers, such as cellulose acetate-butyrate, cellulose propionate, ethyl cellulose, methyl cellulose, nitrocellulose, etc.; poly-amides and polyimides, including aryl polyamides and aryl polyimides; polyethers; polyetherimides; polyetherketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polypyrrolones; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Preferably, the polymer is a rigid, glassy polymer at room temperature as opposed to a rubbery polymer or a flexible glassy polymer. Glassy polymers are differentiated from rubbery polymers by the rate of segmental movement of polymer chains. Polymers in the glassy state do not have the rapid molecular motions that permit rubbery polymers their liquid-like nature and their ability to adjust segmental configurations rapidly over large distances (>0.5 nm). Glassy polymers exist in a non-equilibrium state with entangled molecular chains with immobile molecular backbones in frozen conformations. The glass transition temperature (Tg) is the dividing point between the rubbery or glassy state. Above the Tg, the polymer exists in the rubbery state; below the Tg, the polymer exists in the glassy state. Generally, glassy polymers provide a selective environment for gas diffusion and are favored for gas separation applications. Rigid, glassy polymers describe polymers with rigid polymer chain backbones that have limited intramolecular rotational mobility and are often characterized by having high glass transition temperatures. Preferred polymer precursors have a glass transition temperature of at least 200° C.

In rigid, glassy polymers, the diffusion coefficient tends to control selectivity, and glassy membranes tend to be selective in favor of small, low-boiling molecules. For example, preferred membranes may be made from rigid, glassy polymer materials that will pass carbon dioxide, hydrogen sulfide and nitrogen preferentially over methane and other light hydrocarbons. Such polymers are well known in the art and include polyimides, polysulfones and cellulosic polymers.

The asymmetric polymer precursor fiber may be a composite structure comprising a first polymer material supported on a porous second polymer material. Composite structures may be formed by using more than one polymer material as the dope during the asymmetric hollow fiber spinning process.

In some embodiments, the polymer precursor fiber may contain functional reactive groups that react with the modifying agent. As demonstrated in Example 2, reaction of the modifying agent and the polymer precursor fiber is not necessary for the formation of either a morphology stabilizer or a modified CMS hollow fiber membrane. However, it is contemplated that some precursor polymer materials may react with the modifying agent. For example, precursors prepared using polymer materials that contain hydroxyl (—OH) groups or acid (such as —COOH) functional groups may react with the modifying agent. It is contemplated that this reaction may take place in addition to the sol-gel reaction between the modifying agent and moisture within the pores, and that pyrolysis will still result in a morphology stabilizer and an asymmetric modified CMS hollow fiber membrane.

Modifying Agents

The term modifying agent, as used herein, refers to a compound that is capable of undergoing a reaction within the pores of a polymer precursor fiber to form a morphology stabilizer without otherwise adversely affecting the mechanical properties of the fiber.

Preferred modifying agents are those that undergo a polycondensation reaction to form siloxane bridges. For example, the modifying agent may be a silane having the general formula $R^1R^2R^3R^4Si$, where each of $R^1$, $R^2$, $R^3$, and $R^4$ are independently $C_1$-$C_6$ alkyl or alkenyl, alkoxy, or halogen, with the proviso that the silane contains at least one $C_1$-$C_6$ alkyl or alkenyl substituent and at least one alkoxy or halogen substituent. The at least one alkoxy or halogen substituent provides the silane with the capability of forming a chain-like network of siloxane bonds. The at least one $C_1$-$C_6$ alkyl or alkenyl substituent provides that the treatment of a fiber with the modifying agent does not render the fiber brittle. Subject to this proviso, each of the substituents can be varied in order to provide the silane with desired properties. For example, by selection of the substituent groups, one may be able to alter the porosity of the resulting morphology stabilizer.

In some preferred embodiments, vinyl trimethoxy silane (VTMS) is used as the modifying agent for precursor treatment, but other silanes can also be employed as a modifying agent. The modifying agent, for example, may be a monosilane or an oligosiloxane such as a disiloxane or a trisiloxane. For instance, in various embodiments, the modifying agent may be selected from the group consisting of vinyl trimethoxysilane, vinyl triethoxysilane, vinyl dimethoxychlorosilane, vinyl diethoxychlorosilane, vinyl methoxydichlorosilane, vinyl ethoxydichloro silane, vinyl trichloro silane, vinyl pentamethoxydisiloxane, divinyl tetramethoxydisiloxane, and combinations thereof. In various particularly preferred embodiments, the at least one alkoxy or halogen substituent comprises methoxy or ethoxy. In various particularly preferred embodiments, the at least one $C_1$-$C_6$ alkyl or alkenyl substituent comprises vinyl. Particularly preferred modifying agents include vinyl trimethoxy silane, vinyl triethoxy silane, ethane trimethoxy silane, and methyl trimethoxy silane.

Other modifying agents include those that undergo a polycondensation reaction to form metal-oxo and/or metal oxycarbide bonds. For example, the modifying agent may be a metal alkoxide having the general formula $R^1R^2R^3R^4M$, where M is a metal and where each of $R^1$, $R^2$, $R^3$, and $R^4$ are independently $C_1$-$C_6$ alkyl or alkenyl, alkoxy, or halogen, with the proviso that the metal alkoxide contain at least one $C_1$-$C_6$ alkyl or alkenyl substituent and at least one alkoxy or halogen substituent. The at least one alkoxy or halogen substituent provides the metal alkoxide with the capability of forming a chain-like network of metal-oxo and/or metal oxycarbide bonds. The at least one $C_1$-$C_6$ alkyl or alkenyl substituent provides that the treatment of a fiber with the metal alkoxide does not render the fiber brittle. Subject to this proviso, each of the substituents can be varied in order to provide the metal alkoxide with desired properties. For example, by selection of the substituent groups, one may be able to alter the porosity of the resulting morphology stabilizer. In preferred embodiments, the metal M is selected from the group consisting of Ge, B, Al, Ti, V, Fe, and combinations thereof.

Treatment and Pyrolysis Conditions

In modifying a polymer precursor fiber to prepare a substantially non-collapsed, asymmetric modified CMS hollow fiber membrane, the process comprises the steps of providing the polymer precursor, providing a contacting solution comprising a modifying agent (which is present in the solution at a concentration of less than 100 wt %), and allowing at least a portion of the polymer precursor to contact at least a portion of the contacting solution comprising the modifying agent to create a modified polymer precursor that, when pyrolyzed, produces a substantially non-collapsed, asymmetric modified CMS hollow fiber membrane. Preferably, the polymer precursor is soaked in a solution comprising the modifying agent at a desired concentration for a period of time sufficient to allow the modifying agent to enter the substructure pores of the precursor fiber. Preferably, the period of time is from about 30 minutes to about 24 hours.

The solution containing the modifying agent need not contact an end of the hollow precursor fiber in order to enter the substructure pores of the precursor fiber. Rather, it has been found that the modifying agent may penetrate the outer skin of the precursor fiber in a radial direction, and enter the substructure pores of the fiber in this manner.

The contacting of a precursor fiber with a modifying agent preferably takes place at room temperature. However, in some additional embodiments, the contacting temperature may be held within a range selected from approximately 20° C. to approximately the polymer precursor glass transition temperature; from approximately 100° C. to approximately the polymer precursor glass transition temperature; and from approximately 100° C. to approximately 250° C.

In various embodiments, the reaction of the modifying agent to form a morphology stabilizer may require the addition of a catalyst. For example, when vinyl triethoxy silane is used as the modifying agent, it may be desirable to add a catalyst to promote the sol-gel reaction. This is due to the slow reaction of ethoxy groups compared to the methoxy groups of, for example, VTMS. The sol-gel reaction can be promoted through the addition of an acid, such as a mineral acid, as it is known in the art that a sol-gel reaction is often significantly increased under acidic conditions. Preferred acid catalysts include any readily available mineral acid, such as hydrochloric acid, sulfuric acid, nitric acid, phosphoric acid, boric acid, hydrofluoric acid, hydrobromic acid, perchloric acid, and combinations thereof.

Once the precursor fiber has been in contact with the modifying agent, e.g. by soaking in a solution containing the modifying agent at a selected concentration, the treated precursor fiber is contacted with moisture, such as by placing the fiber under a moisture-containing atmosphere. The moisture-containing atmosphere may be one that has a relative humidity between about 50% and 100%. The precursor fibers are preferably held under the moisture-containing atmosphere for a period of time between about 1 hour and 60 hours.

The treated precursor fibers are then dried and pyrolyzed. The pyrolysis is advantageously conducted under an inert atmosphere. The pyrolysis temperature may be between about 500° and about 800° C.; alternatively, the pyrolysis temperature may be between about 500° and about 700° C.; alternatively, the pyrolysis temperature may be between about 500° and 650° C.; alternatively, the pyrolysis temperature may be between about 500° and 600° C.; alternatively, the pyrolysis temperature may be between about 500° and 550° C.; alternatively, the pyrolysis temperature may be between about 550° and about 700° C.; alternatively, the pyrolysis temperature may be between about 550° and about 650° C. alternatively the pyrolysis temperature may be between about 600° and about 700° C.; alternatively the pyrolysis temperature may be between about 600° and about 650° C. The pyrolysis temperature is typically reached by a process in which the temperature is slowly ramped up. For example, when using a pyrolysis temperature of 650° C., the pyrolysis temperature may be achieved by increasing the temperature from 50° C. to 250° C. at a ramp rate of 13.3° C./min, increasing the temperature from 250° C. to 635° C. at a ramp rate of 3.85° C./min, and increasing the temperature from 635° C. to 650° C. at a ramp rate of 0.25° C./min. Once the pyrolysis temperature is reached, the fibers are heated at the pyrolysis temperature for a soak time, which may be a number of hours.

The polymer precursor fibers may also be bundled and pyrolyzed as a bundle in order produce a large amount of modified CMS hollow fiber membranes in a single pyrolysis run. Although pyrolysis will generally be referred to in terms of pyrolysis of a precursor fiber, it should be understood that any description of pyrolysis used herein is meant to include pyrolysis of precursor fibers that are bundled as well as those that are non-bundled.

Typically, heating of bundled polymer precursor fibers above the glass transition temperature of the polymer material, such as occurs during pyrolysis, causes the fibers to stick together. This sticking together of the bundled fibers reduces their desirability for use as a CMS hollow fiber membrane. By treating polymer precursor fibers with a modifying agent, as described herein, sticking between fibers in a bundle can be reduced or eliminated. During treatment, the modifying agent reacts to form a thin film on the outer skin surfaces of the precursor fibers. For instance, when a precursor fiber is treated with VTMS, the treated precursor fiber will comprises a thin film of silicon-containing material on the outer skin surface, and after pyrolysis, the modified CMS hollow fiber will comprise a thin film of silica on the outer skin surface. This thin film acts as a mechanical barrier, preventing the fibers from sticking together during pyrolysis. As a result, the gas separation properties of the asymmetric modified CMS hollow fiber membranes that undergo pyrolysis in a bundle are similar to asymmetric modified CMS hollow fiber membranes that are not bundled during pyrolysis.

Thus, as will be described in more detail below, it is the concentration of the modifying agent during treatment and the pyrolysis temperature that most affect the gas separation properties of a modified CMS hollow fiber membrane produced from a selected precursor fiber.

Selecting the Concentration of the Modifying Agent

It has now surprisingly been found that diluting the modifying agent before treatment of a polymer precursor fiber results in a modified CMS hollow fiber membrane having an increased permeance over a modified CMS hollow fiber membrane produced by treatment of a polymer precursor with a pure modifying agent. The diluent may be any liquid that does not interfere with the reaction of the modifying agent to form a morphology stabilizer. Suitable diluents include the $C_5$ or greater linear or branched-chain aliphatic hydrocarbons. Preferred diluents, for example, include n-hexane, toluene, and n-heptane.

Comparative Example 1

Figure 14:
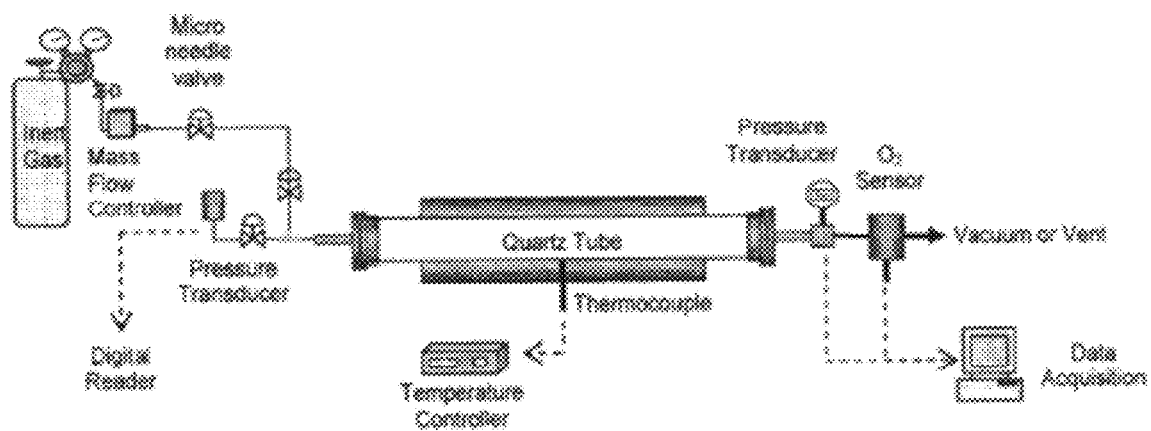
FIG. 14 is an illustration of an exemplary pyrolysis process that can be used with various embodiments of the present invention.
Figure 15A:
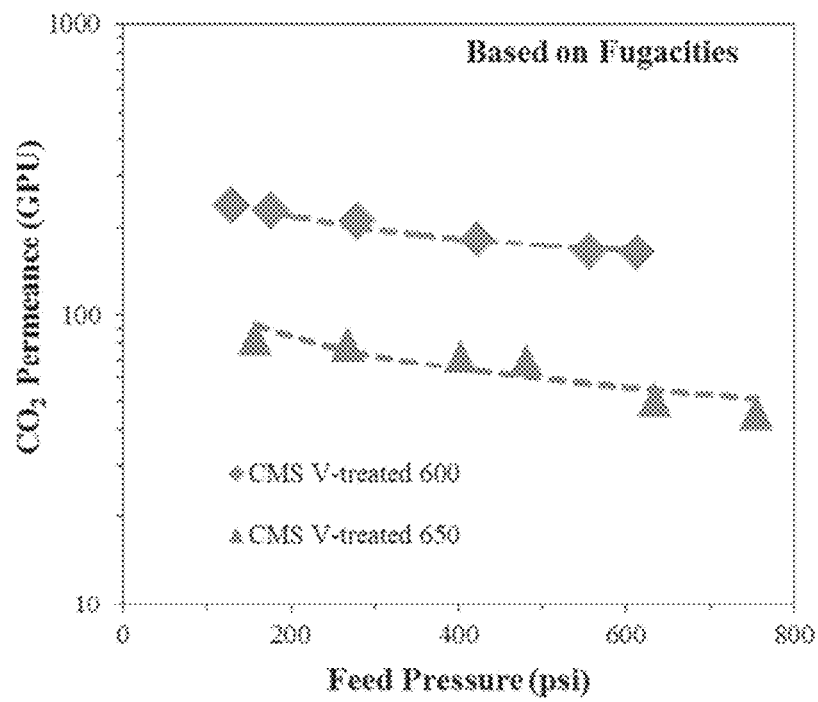
FIG. 15A shows the $CO_2$ permeance of exemplary asymmetric modified CMS hollow fiber membranes (prepared by treating Matrimid 2158® precursor fibers with a solution containing 10 wt % VTMS and pyrolyzing at two different temperatures) in a mixed gas containing 50 mole % $CO_2$ and 50 mole % $CH_4$ and at pressures up to 800 pounds per square inch (psi).
Figure 15B:
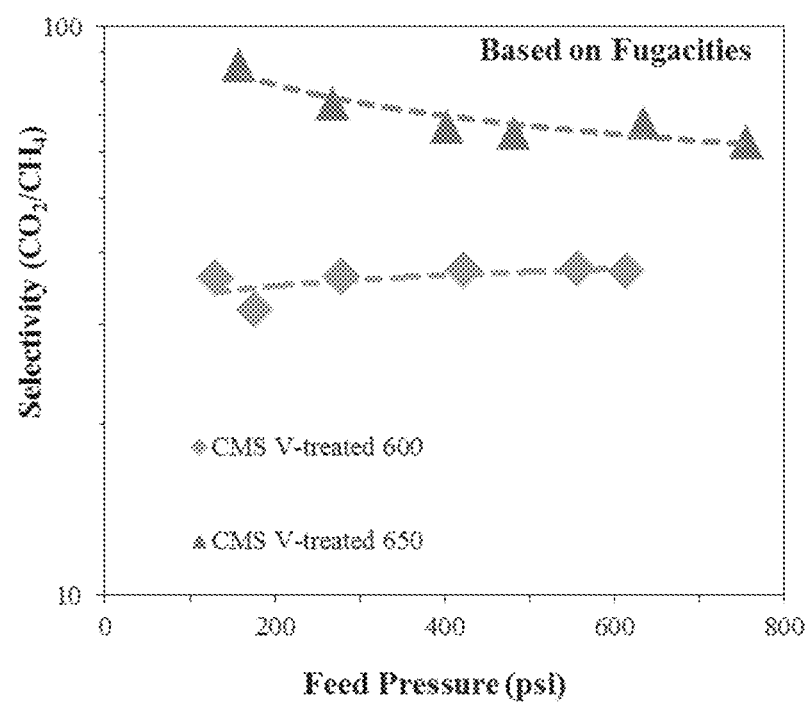
FIG. 15B shows the $CO_2/CH_4$ selectivity of exemplary asymmetric modified CMS hollow fiber membranes (prepared by treating Matrimid 2158® precursor fibers with a solution containing 10 wt % VTMS and pyrolyzing at two different temperatures) in a mixed gas containing 50 mole % $CO_2$ and 50 mole % $CH_4$ and at pressures up to 800 pounds per square inch (psi).

Untreated Matrimid® 5218 precursor fibers were placed on a stainless steel wire mesh and held in place by wrapping a length of wire around the mesh and fibers. The mesh support containing the fibers was then loaded to a pyrolysis setup, such as the type that is illustrated in FIG. 14. Pyrolysis was performed under an atmosphere of ultra high purity argon (99.9% pure) as follows:
1. 50° C. to 250° C. at a ramp rate of 13.3° C./min
2. 250° C. to 635° C. at a ramp rate of 3.85° C./min
3. 635° C. to 650° C. at a ramp rate of 0.25° C./min
4. Soak for 2 hours at 650° C.

The resulting CMS fibers were tested in a single fiber module, such as the one described by Koros et al. in U.S. Pat. No. 6,565,631, the contents of which are hereby incorporated by reference. The CMS fiber module was tested using a constant-volume variable pressure permeation system for both pure and mixed gas feeds similar to the one described by Koros et al. in U.S. Pat. No. 6,565,631. The CMS fibers were tested using a mixed gas feed containing 50 mol % $CO_2$ and 50 mol % $CH_4$ at a pressure of 150 psi (pounds per square inch). The temperature was maintained at 35° C.

The permeance of $CO_2$ through the CMS fibers was measured to be about 8 to 10 GPU. The $CO_2/CH_4$ selectivity was determined to be about 99 to 100.

Comparative Example 2

Matrimid® 5218 precursor fibers were soaked in pure VTMS (i.e. 100 wt % VTMS) for a time of about twelve hours. The fibers were then removed from the solution and placed in a glove bag containing air at a relative humidity of 100%. After about 48 hours, the fibers were removed and dried by heating under vacuum at 150° C. for about 12 hours. The treated precursor fibers were then placed on a stainless steel wire mesh and held in place by wrapping a length of wire around the mesh and fibers. The mesh support containing the fibers was then loaded to a pyrolysis setup, such as the type that is illustrated in FIG. 14. Pyrolysis was performed under an atmosphere of ultra high purity argon (99.9% pure) as follows:
1. 50° C. to 250° C. at a ramp rate of 13.3° C./min
2. 250° C. to 635° C. at a ramp rate of 3.85° C./min
3. 635° C. to 650° C. at a ramp rate of 0.25° C./min
4. Soak for 2 hours at 650° C.

The resulting modified CMS fibers were tested in a single fiber module, such as the one described by Koros et al. in U.S. Pat. No. 6,565,631, the contents of which are hereby incorporated by reference. The CMS fiber module was tested in a constant-volume variable pressure permeation system for both pure and mixed gas feeds similar to the one described by Koros et al. in U.S. Pat. No. 6,565,631. The modified CMS fibers were tested using a mixed gas feed containing 50 mol % $CO_2$ and 50 mol % $CH_4$ at a pressure of 150 psi (pounds per square inch). The temperature was maintained at 35° C.

The permeance of $CO_2$ through the modified CMS fibers was measured to be about 35 to 40 GPU. The $CO_2/CH_4$ selectivity was determined to be about 90 to 95.

Example 3

A solution of hexane and VTMS was prepared. The VTMS made up 75 percent by weight (75 wt %) of the solution. Matrimid® 5218 precursor fibers were soaked in the solution for a time of about twelve hours. The fibers were then removed from the solution and placed in a glove bag containing air at a relative humidity of 100%. After about 48 hours, the fibers were removed and dried by heating under vacuum at 150° C. for about 12 hours. The treated precursor fibers were then placed on a stainless steel wire mesh and held in place by wrapping a length of wire around the mesh and fibers. The mesh support containing the fibers was then loaded to a pyrolysis setup, such as the type that is illustrated in FIG. 14. Pyrolysis was performed under an atmosphere of ultra high purity argon (99.9% pure) as follows:
1. 50° C. to 250° C. at a ramp rate of 13.3° C./min
2. 250° C. to 635° C. at a ramp rate of 3.85° C./min
3. 635° C. to 650° C. at a ramp rate of 0.25° C./min
4. Soak for 2 hours at 650° C.

The resulting modified CMS fibers were tested in a single fiber module, such as the one described by Koros et al. in U.S. Pat. No. 6,565,631, the contents of which are hereby incorporated by reference. The CMS fiber module was tested in a constant-volume variable pressure permeation system for both pure and mixed gas feeds similar to the one described by Koros et al. in U.S. Pat. No. 6,565,631. The modified CMS fibers were tested using a mixed gas feed containing 50 mol % $CO_2$ and 50 mol % $CH_4$ at a pressure of 150 psi (pounds per square inch). The temperature was maintained at 35° C.

The permeance of $CO_2$ through the modified CMS fibers was measured to be about 40 to 42 GPU. The $CO_2/CH_4$ selectivity was determined to be about 95 to 100.

Example 4

A solution of hexane and VTMS was prepared. The VTMS made up 75 percent by weight (75 wt %) of the solution, with the hexane making up the other 25 weight percent. Matrimid® 5218 precursor fibers were soaked in the solution for a time of about twelve hours. The fibers were then removed from the solution and placed in a glove bag containing air at a relative humidity of 100%. After about 48 hours, the fibers were removed and dried by heating under vacuum at 150° C. for about 12 hours. The treated precursor fibers were then placed on a stainless steel wire mesh and held in place by wrapping a length of wire around the mesh and fibers. The mesh support containing the fibers was then loaded to a pyrolysis setup, such as the type that is illustrated in FIG. 14. Pyrolysis was performed under an atmosphere of ultra high purity argon (99.9% pure) as follows:
1. 50° C. to 250° C. at a ramp rate of 13.3° C./min
2. 250° C. to 535° C. at a ramp rate of 3.85° C./min
3. 535° C. to 550° C. at a ramp rate of 0.25° C./min
4. Soak for 2 hours at 550° C.

Figure 7:
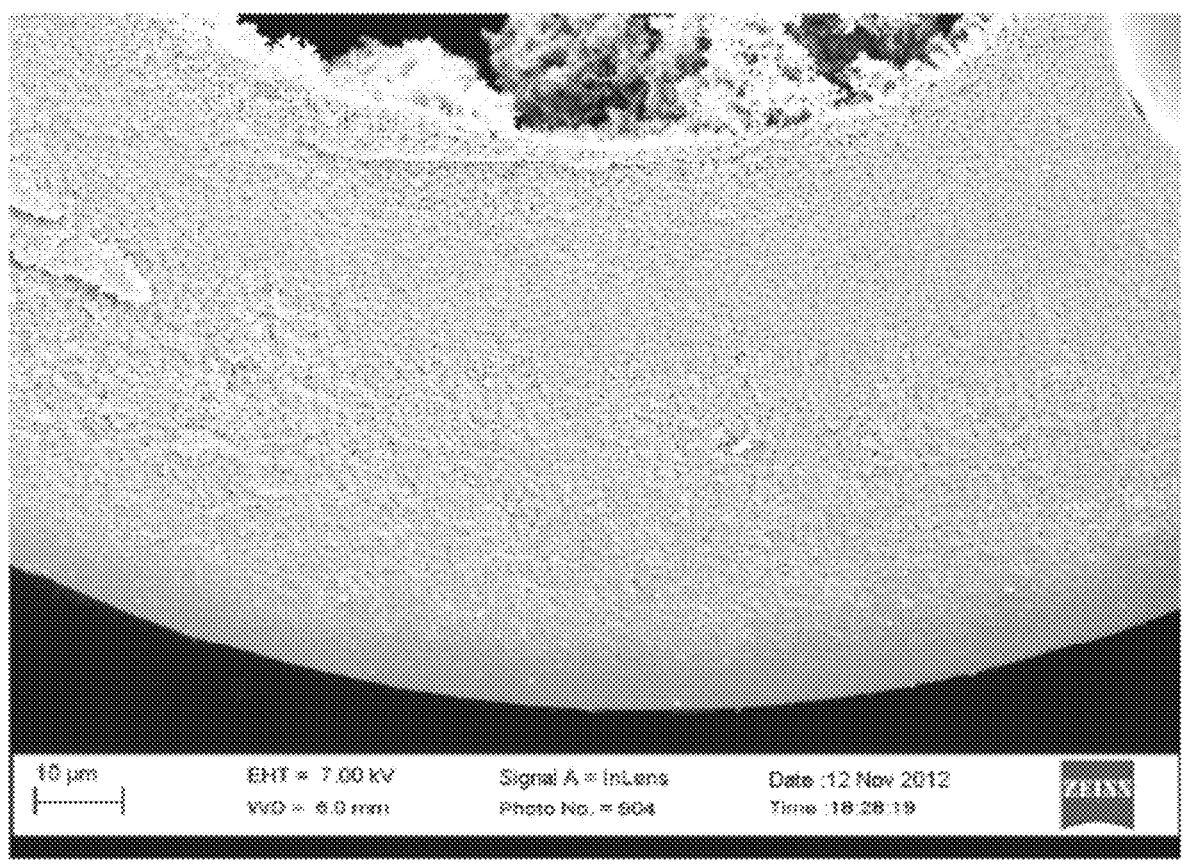
FIG. 7 shows SEM images of asymmetric modified CMS hollow fibers prepared by contacting a Matrimid® 5218 precursor fiber with a solution comprising 75 percent by weight (75 wt %) VTMS and pyrolyzed at 550° C.

The resulting modified CMS fibers were analyzed by scanning electron microscope (SEM). SEM analysis showed restricted substructure collapse. An SEM image of the CMS fibers is shown in FIG. 7.

Example 5

A solution of hexane and VTMS was prepared. The VTMS made up 50 percent by weight (50 wt %) of the solution. Matrimid® 5218 precursor fibers were soaked in the solution for a time of about twelve hours. The fibers were then removed from the solution and placed in a glove bag containing air at a relative humidity of 100%. After about 48 hours, the fibers were removed and dried by heating under vacuum at 150° C. for about 12 hours. The treated precursor fibers were then placed on a stainless steel wire mesh and held in place by wrapping a length of wire around the mesh and fibers. The mesh support containing the fibers was then loaded to a pyrolysis setup, such as the type that is illustrated in FIG. 14. Pyrolysis was performed under an atmosphere of ultra high purity argon (99.9% pure) as follows:
1. 50° C. to 250° C. at a ramp rate of 13.3° C./min
2. 250° C. to 635° C. at a ramp rate of 3.85° C./min
3. 635° C. to 650° C. at a ramp rate of 0.25° C./min
4. Soak for 2 hours at 650° C.

The resulting modified CMS fibers were tested as described in Example 3. The permeance of $CO_2$ through the modified CMS fibers was measured to be about 45 to 48 GPU. The $CO_2/CH_4$ selectivity was determined to be about 90 to 95.

Example 6

A solution of hexane and VTMS was prepared. The VTMS made up 50 percent by weight (50 wt %) of the solution, with the hexane making up the other 50 weight percent. Matrimid® 5218 precursor fibers were soaked in the solution for a time of about twelve hours. The fibers were then removed from the solution and placed in a glove bag containing air at a relative humidity of 100%. After about 48 hours, the fibers were removed and dried by heating under vacuum at 150° C. for about 12 hours. The treated precursor fibers were then placed on a stainless steel wire mesh and held in place by wrapping a length of wire around the mesh and fibers. The mesh support containing the fibers was then loaded to a pyrolysis setup, such as the type that is illustrated in FIG. 14. Pyrolysis was performed under an atmosphere of ultra high purity argon (99.9% pure) as follows:
1. 50° C. to 250° C. at a ramp rate of 13.3° C./min
2. 250° C. to 535° C. at a ramp rate of 3.85° C./min
3. 535° C. to 550° C. at a ramp rate of 0.25° C./min
4. Soak for 2 hours at 550° C.

Figure 8:
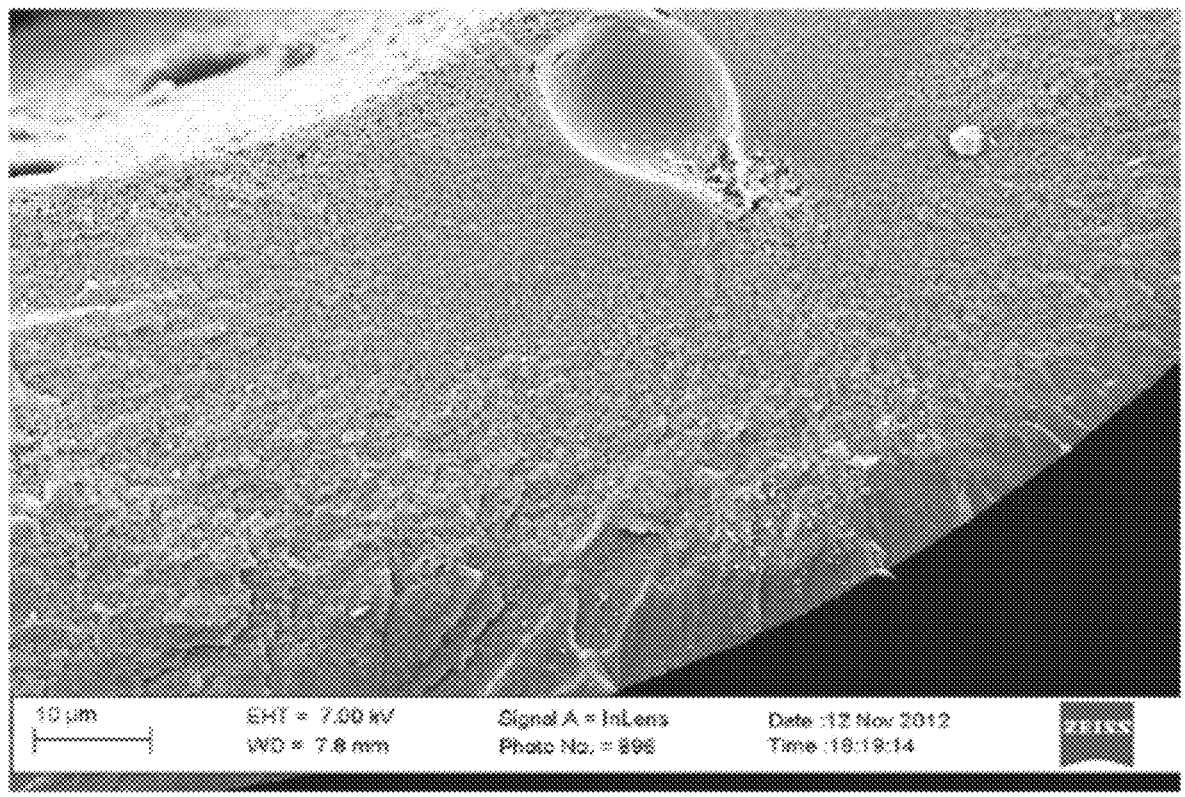
FIG. 8 shows SEM images of asymmetric modified CMS hollow fibers prepared by contacting a Matrimid® 5218 precursor fiber with a solution comprising 50 percent by weight (50 wt %) VTMS and pyrolyzed at 550° C.

The resulting modified CMS fibers were analyzed by scanning electron microscope (SEM). SEM analysis showed restricted substructure collapse. An SEM image of the CMS fibers is shown in FIG. 8.

Example 7

A solution of hexane and VTMS was prepared. The VTMS made up 25 percent by weight (25 wt %) of the solution. Matrimid® 5218 precursor fibers were soaked in the solution for a time of about twelve hours. The fibers were then removed from the solution and placed in a glove bag containing air at a relative humidity of 100%. After about 48 hours, the fibers were removed and dried by heating under vacuum at 150° C. for about 12 hours. The treated precursor fibers were then placed on a stainless steel wire mesh and held in place by wrapping a length of wire around the mesh and fibers. The mesh support containing the fibers was then loaded to a pyrolysis setup, such as the type that is illustrated in FIG. 14. Pyrolysis was performed under an atmosphere of ultra high purity argon (99.9% pure) as follows:
1. 50° C. to 250° C. at a ramp rate of 13.3° C./min
2. 250° C. to 635° C. at a ramp rate of 3.85° C./min
3. 635° C. to 650° C. at a ramp rate of 0.25° C./min
4. Soak for 2 hours at 650° C.

The resulting modified CMS fibers were tested as described in Example 3. The permeance of $CO_2$ through the modified CMS fibers was measured to be about 50 to 55 GPU. The $CO_2/CH_4$ selectivity was determined to be about 88 to 91.

Example 8

A solution of hexane and VTMS was prepared. The VTMS made up 25 percent by weight (25 wt %) of the solution, with the hexane making up the other 75 weight percent. Matrimid® 5218 precursor fibers were soaked in the solution for a time of about twelve hours. The fibers were then removed from the solution and placed in a glove bag containing air at a relative humidity of 100%. After about 48 hours, the fibers were removed and dried by heating under vacuum at 150° C. for about 12 hours. The treated precursor fibers were then placed on a stainless steel wire mesh and held in place by wrapping a length of wire around the mesh and fibers. The mesh support containing the fibers was then loaded to a pyrolysis setup, such as the type that is illustrated in FIG. 14. Pyrolysis was performed under an atmosphere of ultra high purity argon (99.9% pure) as follows:
1. 50° C. to 250° C. at a ramp rate of 13.3° C./min
2. 250° C. to 535° C. at a ramp rate of 3.85° C./min
3. 535° C. to 550° C. at a ramp rate of 0.25° C./min
4. Soak for 2 hours at 550° C.

Figure 9:
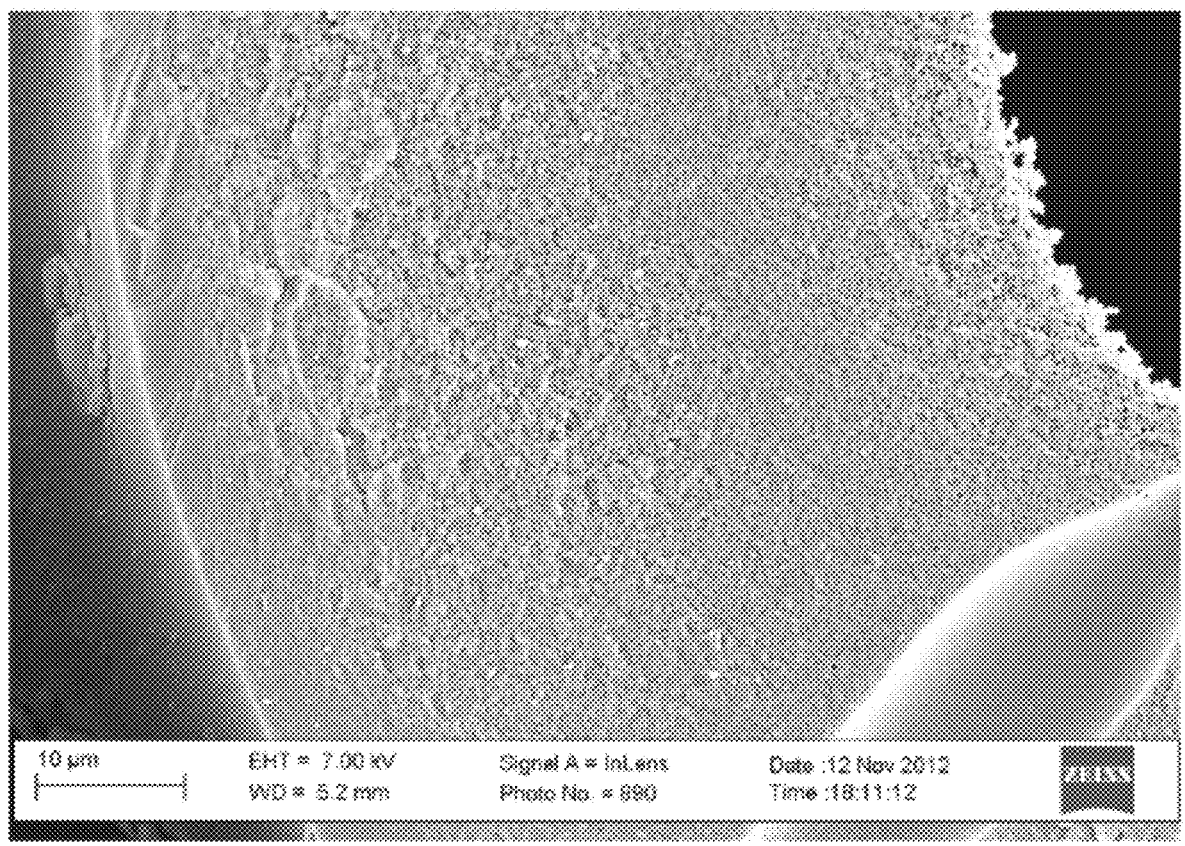
FIG. 9 shows SEM images of asymmetric modified CMS hollow fibers prepared by contacting a Matrimid precursor fiber with a solution comprising 25 percent by weight (25 wt %) VTMS and pyrolyzed at 550° C.
Figure 10:
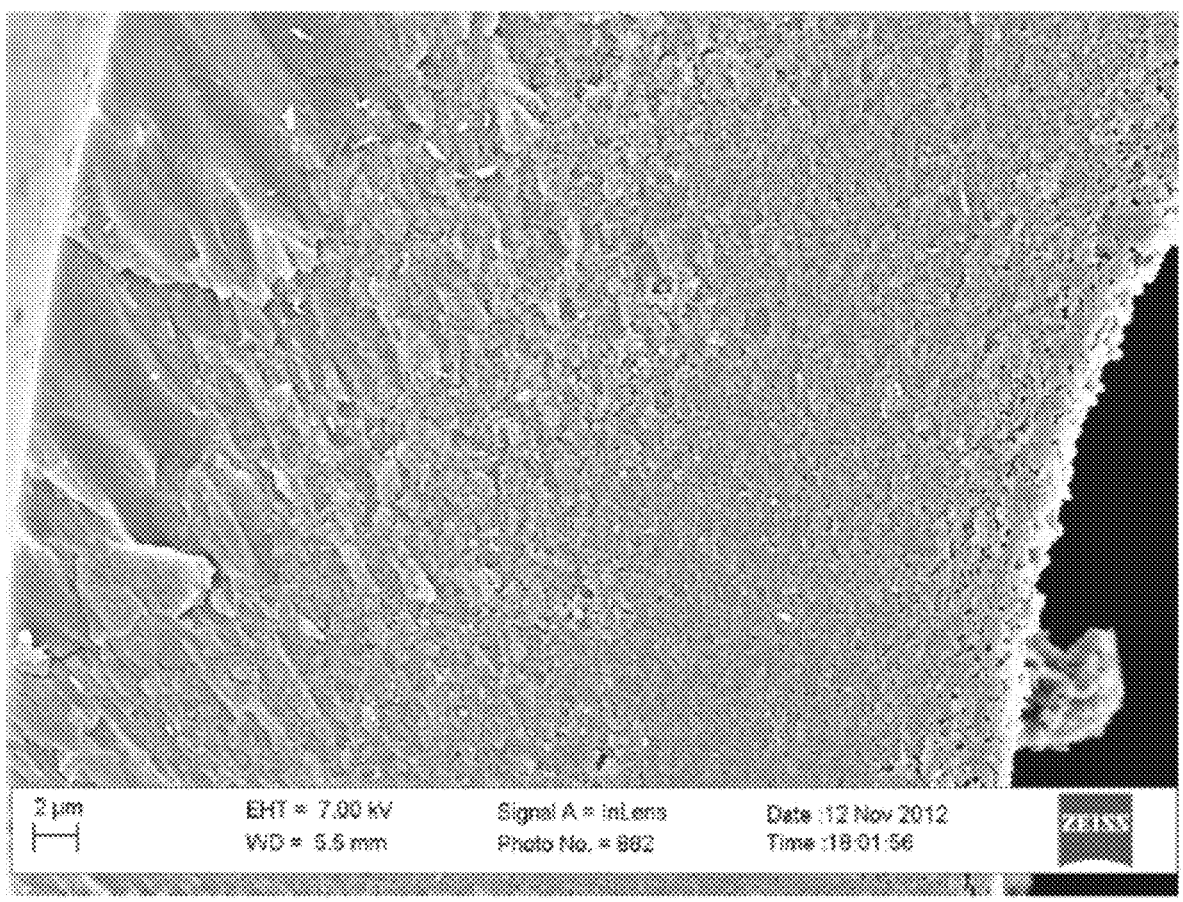
FIG. 10 shows SEM images of asymmetric modified CMS hollow fibers prepared by contacting a Matrimid® 5218 precursor fiber with a solution comprising 10 percent by weight (10 wt %) VTMS and pyrolyzed at 550° C.
Figure 11:
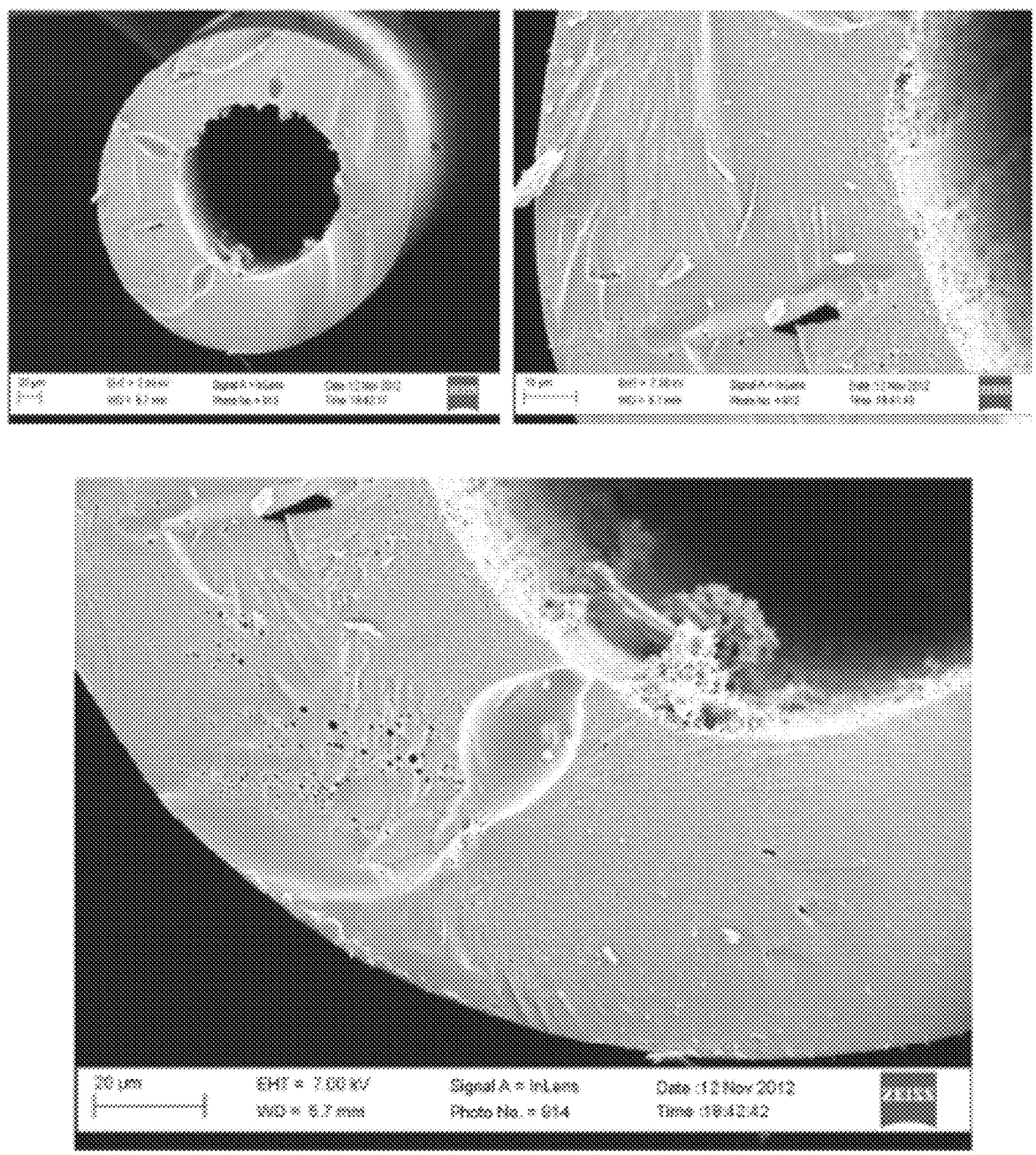
FIG. 11 shows SEM images of asymmetric modified CMS hollow fibers prepared by contacting a Matrimid® 5218 precursor fiber with a solution comprising 5 percent by weight (5 wt %) VTMS and pyrolyzed at 550° C.
Figure 12:
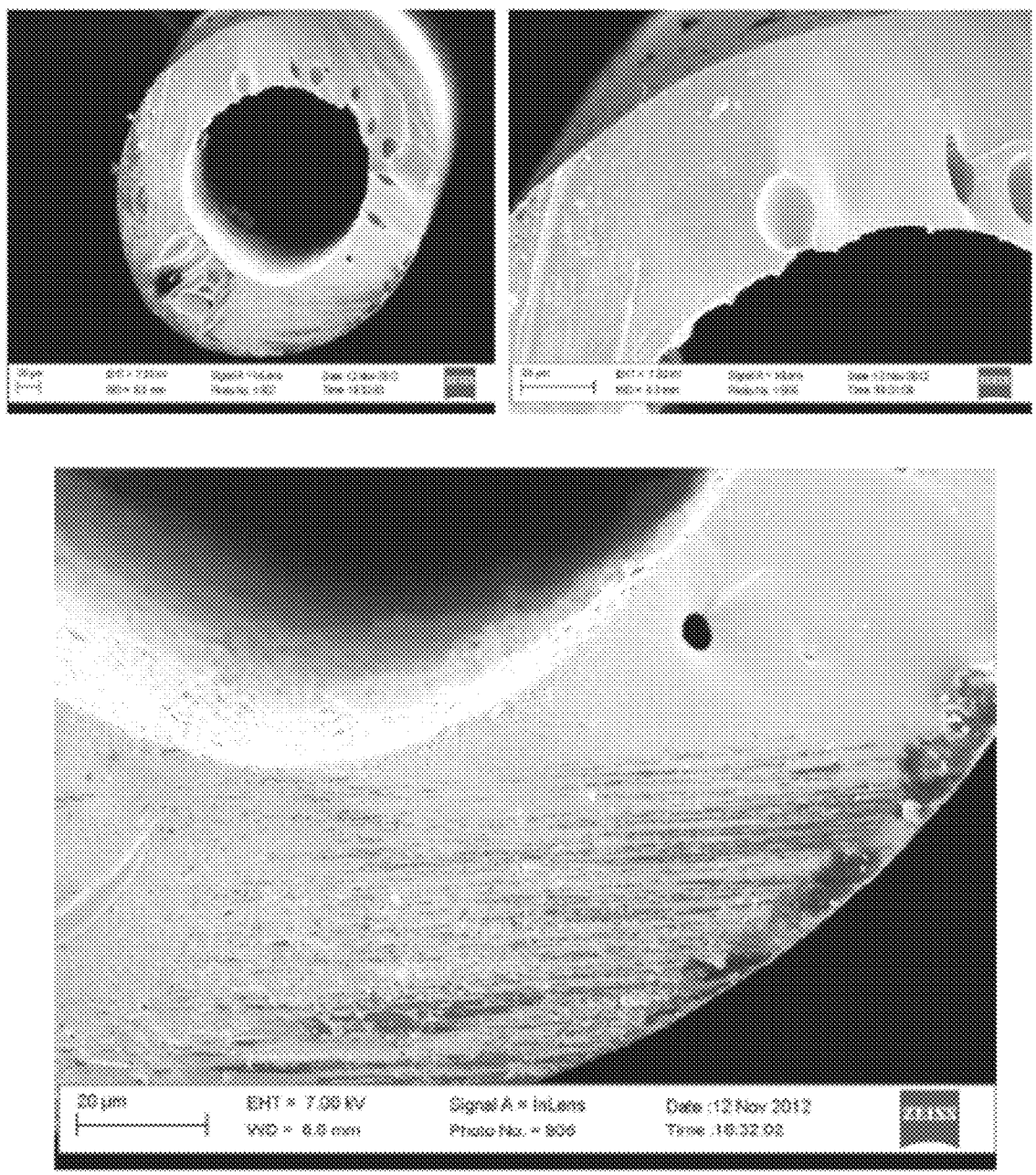
FIG. 12 shows SEM images of asymmetric modified CMS hollow fibers prepared by contacting a Matrimid® 5218 precursor fiber with a solution comprising 1 percent by weight (1 wt %) VTMS and pyrolyzed at 550° C.

The resulting modified CMS fibers were analyzed by scanning electron microscope (SEM). SEM analysis showed restricted substructure collapse. An SEM image of the CMS fibers is shown in FIG. 9.

Example 9

A solution of hexane and VTMS was prepared. The VTMS made up 10 percent by weight (10 wt %) of the solution. Matrimid® 5218 precursor fibers were soaked in the solution for a time of about twelve hours. The fibers were then removed from the solution and placed in a glove bag containing air at a relative humidity of 100%. After about 48 hours, the fibers were removed and dried by heating under vacuum at 150° C. for about 12 hours. The treated precursor fibers were then placed on a stainless steel wire mesh and held in place by wrapping a length of wire around the mesh and fibers. The mesh support containing the fibers was then loaded to a pyrolysis setup, such as the type that is illustrated in FIG. 14. Pyrolysis was performed under an atmosphere of ultra high purity argon (99.9% pure) as follows:
1. 50° C. to 250° C. at a ramp rate of 13.3° C./min
2. 250° C. to 635° C. at a ramp rate of 3.85° C./min
3. 635° C. to 650° C. at a ramp rate of 0.25° C./min
4. Soak for 2 hours at 650° C.

The resulting modified CMS fibers were tested as described in Example 3. The permeance of $CO_2$ through the modified CMS fibers was measured to be about 65 to 70 GPU. The $CO_2/CH_4$ selectivity was determined to be about 85 to 90.

Example 10

A solution of hexane and VTMS was prepared. The VTMS made up 10 percent by weight (10 wt %) of the solution, with the hexane making up the other 90 weight percent. Matrimid® 5218 precursor fibers were soaked in the solution for a time of about twelve hours. The fibers were then removed from the solution and placed in a glove bag containing air at a relative humidity of 100%. After about 48 hours, the fibers were removed and dried by heating under vacuum at 150° C. for about 12 hours. The treated precursor fibers were then placed on a stainless steel wire mesh and held in place by wrapping a length of wire around the mesh and fibers. The mesh support containing the fibers was then loaded to a pyrolysis setup, such as the type that is illustrated in FIG. 14. Pyrolysis was performed under an atmosphere of ultra high purity argon (99.9% pure) as follows:
1. 50° C. to 250° C. at a ramp rate of 13.3° C./min
2. 250° C. to 535° C. at a ramp rate of 3.85° C./min
3. 535° C. to 550° C. at a ramp rate of 0.25° C./min
4. Soak for 2 hours at 550° C.

The resulting modified CMS fibers were analyzed by scanning electron microscope (SEM). SEM analysis showed restricted substructure collapse. An SEM image of the CMS fibers is shown in FIG. 8.

Example 11

A solution of hexane and VTMS was prepared. The VTMS made up 5 percent by weight (5 wt %) of the solution. Matrimid® 5218 precursor fibers were soaked in the solution for a time of about twelve hours. The fibers were then removed from the solution and placed in a glove bag containing air at a relative humidity of 100%. After about 48 hours, the fibers were removed and dried by heating under vacuum at 150° C. for about 12 hours. The treated precursor fibers were then placed on a stainless steel wire mesh and held in place by wrapping a length of wire around the mesh and fibers. The mesh support containing the fibers was then loaded to a pyrolysis setup, such as the type that is illustrated in FIG. 14. Pyrolysis was performed under an atmosphere of ultra high purity argon (99.9% pure) as follows:
1. 50° C. to 250° C. at a ramp rate of 13.3° C./min
2. 250° C. to 635° C. at a ramp rate of 3.85° C./min
3. 635° C. to 650° C. at a ramp rate of 0.25° C./min
4. Soak for 2 hours at 650° C.

The resulting modified CMS fibers were tested as described in Example 3. The permeance of $CO_2$ through the modified CMS fibers was measured to be about 18 to 20 GPU. The $CO_2/CH_4$ selectivity was determined to be about 99 to 100.

Example 12

A solution of hexane and VTMS was prepared. The VTMS made up 5 percent by weight (5 wt %) of the solution, with the hexane making up the other 95 weight percent. Matrimid® 5218 precursor fibers were soaked in the solution for a time of about twelve hours. The fibers were then removed from the solution and placed in a glove bag containing air at a relative humidity of 100%. After about 48 hours, the fibers were removed and dried by heating under vacuum at 150° C. for about 12 hours. The treated precursor fibers were then placed on a stainless steel wire mesh and held in place by wrapping a length of wire around the mesh and fibers. The mesh support containing the fibers was then loaded to a pyrolysis setup, such as the type that is illustrated in FIG. 14. Pyrolysis was performed under an atmosphere of ultra high purity argon (99.9% pure) as follows:
1. 50° C. to 250° C. at a ramp rate of 13.3° C./min
2. 250° C. to 535° C. at a ramp rate of 3.85° C./min
3. 535° C. to 550° C. at a ramp rate of 0.25° C./min
4. Soak for 2 hours at 550° C.

The resulting modified CMS fibers were analyzed by scanning electron microscope (SEM). SEM analysis showed partial substructure collapse. An SEM image of the CMS fibers is shown in FIG. 9.

Example 13

A solution of hexane and VTMS was prepared. The VTMS made up 1 percent by weight (1 wt %) of the solution. Matrimid® 5218 precursor fibers were soaked in the solution for a time of about twelve hours. The fibers were then removed from the solution and placed in a glove bag containing air at a relative humidity of 100%. After about 48 hours, the fibers were removed and dried by heating under vacuum at 150° C. for about 12 hours. The treated precursor fibers were then placed on a stainless steel wire mesh and held in place by wrapping a length of wire around the mesh and fibers. The mesh support containing the fibers was then loaded to a pyrolysis setup, such as the type that is illustrated in FIG. 14. Pyrolysis was performed under an atmosphere of ultra high purity argon (99.9% pure) as follows:
1. 50° C. to 250° C. at a ramp rate of 13.3° C./min
2. 250° C. to 635° C. at a ramp rate of 3.85° C./min
3. 635° C. to 650° C. at a ramp rate of 0.25° C./min
4. Soak for 2 hours at 650° C.

The resulting modified CMS fibers were tested as described in Example 3. The permeance of $CO_2$ through the modified CMS fibers was measured to be about 10 to 12 GPU. The $CO_2/CH_4$ selectivity was determined to be about 99 to 100.

Example 14

A solution of hexane and VTMS was prepared. The VTMS made up 1 percent by weight (1 wt %) of the solution, with the hexane making up the other 99 weight percent. Matrimid® 5218 precursor fibers were soaked in the solution for a time of about twelve hours. The fibers were then removed from the solution and placed in a glove bag containing air at a relative humidity of 100%. After about 48 hours, the fibers were removed and dried by heating under vacuum at 150° C. for about 12 hours. The treated precursor fibers were then placed on a stainless steel wire mesh and held in place by wrapping a length of wire around the mesh and fibers. The mesh support containing the fibers was then loaded to a pyrolysis setup, such as the type that is illustrated in FIG. 14. Pyrolysis was performed under an atmosphere of ultra high purity argon (99.9% pure) as follows:
1. 50° C. to 250° C. at a ramp rate of 13.3° C./min
2. 250° C. to 535° C. at a ramp rate of 3.85° C./min
3. 535° C. to 550° C. at a ramp rate of 0.25° C./min
4. Soak for 2 hours at 550° C.

The resulting modified CMS fibers were analyzed by scanning electron microscope (SEM). SEM analysis showed collapsed substructure morphology. An SEM image of the CMS fibers is shown in FIG. 9.

The testing results of the above Examples are summarized in Table 1.

TABLE 1

| | $P(CO_2)$ [GPU] | $CO_2/CH_4$ |
|---|---|---|
| CMS untreated Matrimid ® 5218 (Pyrolysis Temperature 650° C.) | 8-10 | 99-100 |

TABLE 1-continued

| | P(CO$_2$) [GPU] | CO$_2$/ CH$_4$ |
|---|---|---|
| CMS Treated (100% VTMS) Matrimid ® 5218 (Pyrolysis Temperature 650° C.) | 35-40 | 90-95 |
| CMS Treated (75% VTMS) Matrimid ® 5218 (Pyrolysis Temperature 650° C.) | 40-42 | 95-100 |
| CMS Treated (50% VTMS) Matrimid ® 5218 (Pyrolysis Temperature 650° C.) | 45-48 | 90-95 |
| CMS Treated (25% VTMS) Matrimid ® 5218 (Pyrolysis Temperature 650° C.) | 50-55 | 88-91 |
| CMS Treated (10% VTMS) Matrimid ® 5218 (Pyrolysis Temperature 650° C.) | 65-70 | 85-90 |
| CMS Treated (5% VTMS) Matrimid ® 5218 (Pyrolysis Temperature 650° C.) | 18-20 | 99-100 |
| CMS Treated (1% VTMS) Matrimid ® 5218 (Pyrolysis Temperature 650° C.) | 10-12 | 99-100 |

As demonstrated by the above Examples, a polymer precursor fiber that is contacted with a solution comprising a modifying agent that is present in an amount that is less than 100% of the solution surprisingly produces a modified CMS fiber membrane having increased gas permeance when compared against a polymer precursor fiber that is contacted with 100% pure modifying agent. Rather, it has presently been found that until the concentration of modifying agent reaches a point at which it appears to no longer be effective at significantly restricting the collapse of the substructure pores during pyrolysis, the gas permeance of the resulting modified CMS fiber membrane actually increases in response to a decrease in the concentration of the modifying agent in the treatment solution. For VTMS, the point at which the solution appears to no longer be effective at significantly restricting substructure collapse appears to occur at a concentration between about 1% and about 5% by weight. Of the tested solutions, the solution that produced a modified CMS fiber membrane having the highest gas permeance contained modifying agent at a concentration of about 10% by weight.

Various embodiments of the present invention are directed toward contacting a polymer precursor fiber with a solution comprising modifying agent at a concentration between about 1% and about 95% by weight; alternatively between about 1% and about 90%; alternatively between about 1% and about 80%; alternatively between about 1% and about 75%; alternatively between about 1% and about 50%; alternatively between about 1% and about 25%; alternatively between about 1% and about 15%; alternatively between about 1% and about 12%; alternatively between about 5% and about 90% by weight; alternatively between about 5% and about 80%; alternatively between about 5% and about 75%; alternatively between about 5% and about 50%; alternatively between about 5% and about 25%; alternatively between about 5% and about 15%; alternatively between about 5% and about 12%; alternatively between about 5% and about 10%; alternatively between about 8% and about 90% by weight; alternatively between about 8% and about 80%; alternatively between about 8% and about 75%; alternatively between about 8% and about 50%; alternatively between about 8% and about 25%; alternatively between about 8% and about 15%; alternatively between about 8% and about 12%; alternatively between about 10% and about 90% by weight; alternatively between about 10% and about 80%; alternatively between about 10% and about 75%; alternatively between about 10% and about 50%; alternatively between about 10% and about 25%; alternatively between about 10% and about 15%. The above percentages represent the percent by weight of modifying agent in the contacting solution.

Treatment of a polymer precursor fiber with a modifying agent also results in the formation of a residual film on the outer skin layer of the asymmetric modified CMS hollow fiber membrane. Specifically, it is believed that in addition to undergoing a sol-gel reaction process within the pores of the precursor fiber, the modifying agent undergoes a similar reaction to form a film on the outer skin layer of the asymmetric modified CMS hollow fiber. Importantly, this film operates to prevent sticking of the precursor fibers together when they are heated above the glass transition temperature of the polymer, such as during pyrolysis.

Figure 3:
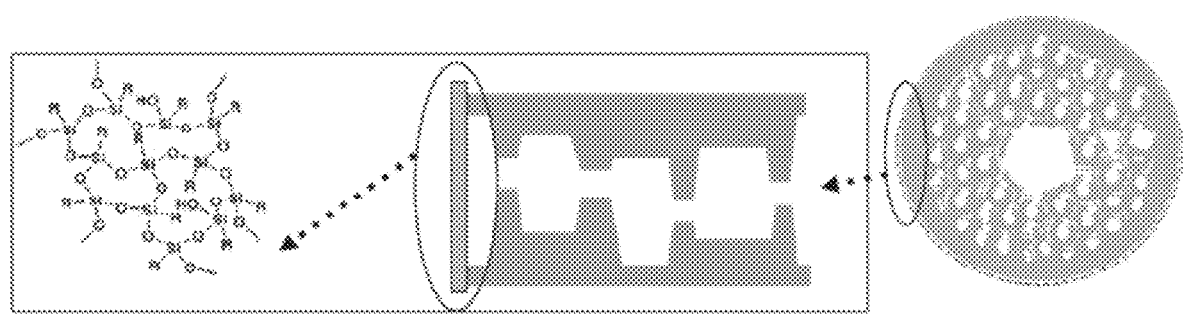
FIG. 3 is an illustration of a film of the type that is believed to form on the outer skin layer of an asymmetric hollow precursor fiber when the precursor fiber is contacted with a modifying agent at high concentrations.
Figure 4:
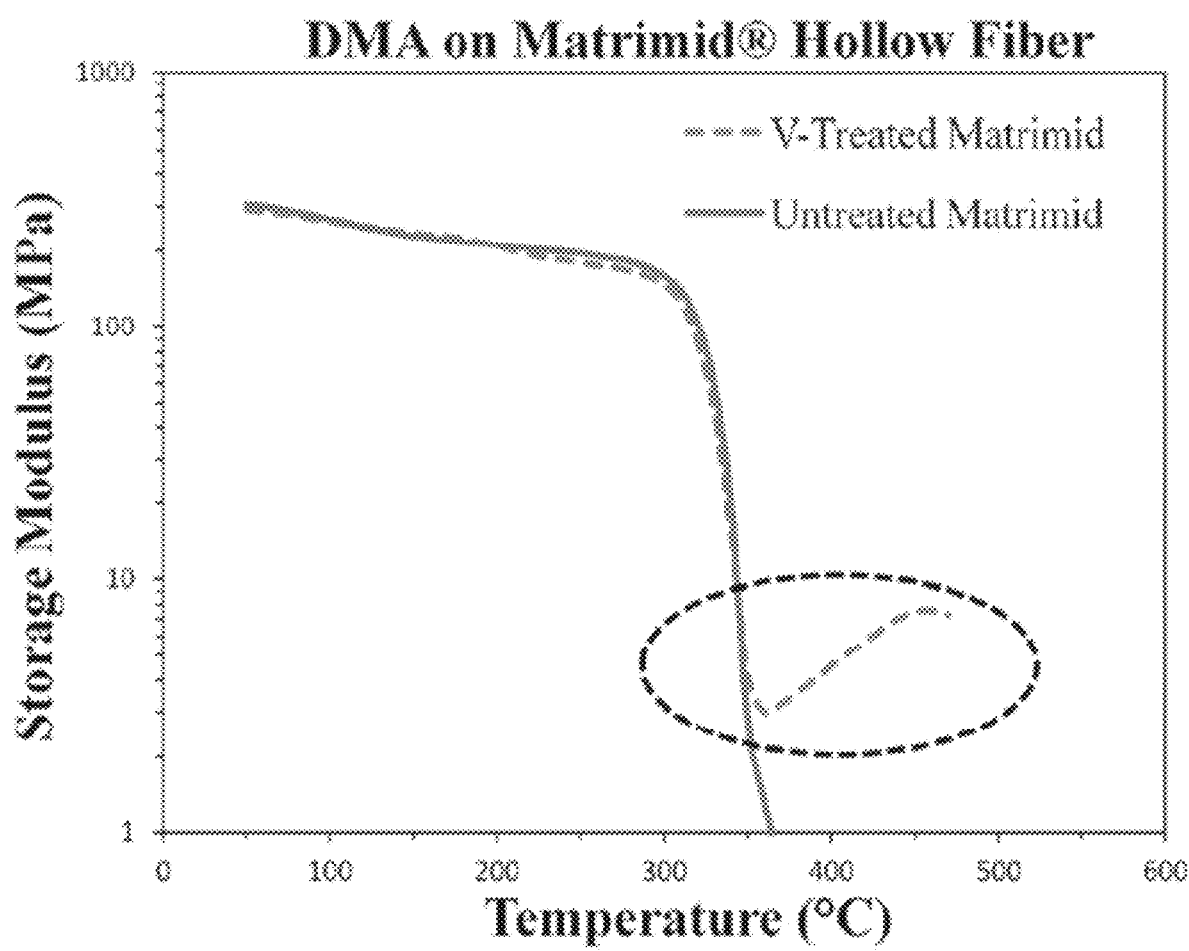
FIG. 4 shows test results of a dynamic mechanical analysis, demonstrating the loss of storage modulus observed on heating of Matrimid® 5218 precursor fibers to their glass transition temperature ($T_g$) and the restriction of such loss observed with Matrimid® 5218 precursor fibers treated according to various embodiments of the present invention.

This film also operates, however, to inhibit the flow of gas through the pores that are present on the outer skin layer of the fiber, decreasing the permeance (and effectiveness) of the asymmetric modified CMS hollow fiber membrane. The formation of a film by the sol-gel reaction of vinyltrimethoxysilane (VTMS), a preferred modifying agent of the present invention, is illustrated in FIG. 3. Accordingly, by reducing the concentration of modifying agent, the formation of the residual film is limited, leading to an increase in gas permeance of the resulting CMS hollow fiber membrane. Without being bound by theory, this effect is believed to explain the surprising result that lowering the concentration of modifying agent in a contacting solution results in a modified CMS hollow fiber membrane having an increased gas permeance property.

Thus, it is an object of the present invention to treat a precursor fiber with a modifying agent, wherein the modifying agent is present at a concentration that is effective to limit the formation of the residual film, substantially minimizing the thickness of the film. Preferably, the concentration of the modifying agent is selected in an amount that is both effective, i.e. sufficiently high to significantly restrict substructure collapse and effective, i.e. sufficiently low to limit the formation of a residual film on the outer skin layer of the asymmetric modified CMS hollow fiber. In this way, an asymmetric modified CMS hollow fiber membrane having both an improved permeance property and beneficial non-stick properties may be prepared.

In various embodiments, the concentration of the modifying agent in the solution is selected to obtain an asymmetric modified CMS hollow fiber membrane having a gas permeance that is at least a 300% increase over an equivalent asymmetric CMS hollow fiber membrane that is not subjected to treatment with the modifying agent. In various embodiments, the concentration of the modifying agent in the solution is selected to obtain an asymmetric modified CMS hollow fiber membrane having a gas permeance that is at least a 400% increase over an equivalent asymmetric CMS hollow fiber membrane that is not subjected to treatment with the modifying agent. In various embodiments, the concentration of the modifying agent in the solution is selected to obtain an asymmetric modified CMS hollow fiber membrane having a gas permeance that is at least a 500% increase over an equivalent asymmetric CMS hollow fiber membrane that is not subjected to treatment with the modifying agent. In various embodiments, the concentration of the modifying agent in the solution is selected to obtain an asymmetric modified CMS hollow fiber membrane having a gas permeance that is at least a 600% increase over an equivalent asymmetric CMS hollow fiber membrane that is not subjected to treatment with the modifying agent.

In various embodiments, the concentration of the modifying agent in the solution is selected to obtain an asymmetric modified CMS hollow fiber membrane having a desired combination of gas permeance and selectivity properties. For example, the concentration of the modifying agent in the solution may be selected to obtain an asymmetric modified CMS hollow fiber membrane having properties that are useful for the separation of $CO_2$ and $CH_4$ within a gas stream comprising any number of additional constituents. Alternatively, the concentration of the modifying agent in the solution may be selected to obtain an asymmetric modified CMS hollow fiber membrane that is useful for the separation of $H_2S$ and $CH_4$ within a gas stream comprising any number of additional constituents. Alternatively, the concentration of the modifying agent in the solution may be selected to obtain an asymmetric modified CMS hollow fiber membrane that is useful for the separation of a mixture of $CO_2$ and $H_2S(CO_2/H_2S)$ from $CH_4$ within a gas stream comprising any number of additional constituents. Alternatively, the concentration of the modifying agent in the solution may be selected to obtain an asymmetric modified CMS hollow fiber membrane that is useful for the separation of $CO_2$ and $N_2$ within a gas stream comprising any number of additional constituents. Alternatively, the concentration of the modifying agent in the solution may be selected to obtain an asymmetric modified CMS hollow fiber membrane that is useful for the separation of $O_2$ and $N_2$ within a gas stream comprising any number of additional constituents. Alternatively, the concentration of the modifying agent in the solution may be selected to obtain an asymmetric modified CMS hollow fiber membrane that is useful for the separation of $N_2$ and $CH_4$ within a gas stream comprising any number of additional constituents. Alternatively, the concentration of the modifying agent in the solution may be selected to obtain an asymmetric modified CMS hollow fiber membrane that is useful for the separation of He and $CH_4$ within a gas stream comprising any number of additional constituents. Alternatively, the concentration of the modifying agent in the solution may be selected to obtain an asymmetric modified CMS hollow fiber membrane that is useful for the separation of $H_2$ and $CH_4$ within a gas stream comprising any number of additional constituents. Alternatively, the concentration of the modifying agent in the solution may be selected to obtain an asymmetric modified CMS hollow fiber membrane that is useful for the separation of $H_2$ and $C_2H_4$ within a gas stream comprising any number of additional constituents. Alternatively, the concentration of the modifying agent in the solution may be selected to obtain an asymmetric modified CMS hollow fiber membrane that is useful for the separation of olefins from paraffins, such as the separation of ethylene and ethane or propylene and propane within a gas stream comprising any number of additional constituents. The concentration of the modifying agent in the solution may also be selected to obtain an asymmetric modified CMS hollow fiber membrane that is useful for the separation of a mixture of olefins from a mixture of paraffins, such as a mixture of ethylene and propylene (ethylene/propylene) from a mixture of ethane and propane (ethane/propane) within a gas stream comprising any number of additional constituents.

In one embodiment, the concentration of the modifying agent in the solution may be selected to obtain an asymmetric modified CMS hollow fiber membrane that is useful for the separation of acid gases, such as $CO_2$ and $H_2S$, from a gas stream that contains or is rich in hydrocarbons, such as a natural gas stream.

In various embodiments, the concentration of the modifying agent in the solution is selected to obtain an asymmetric modified CMS hollow fiber membrane having desirable permeance and selectivity properties, such as may be determined by testing the asymmetric modified CMS hollow fiber membrane in a single fiber module using a constant-volume variable pressure permeation system such as the one described by Koros et al. in U.S. Pat. No. 6,565,631. For example, where the concentration of the modifying agent in the solution is selected to obtain an asymmetric modified CMS hollow fiber membrane having properties that are desirable for the separation of $CO_2$ and $CH_4$, the concentration of the modifying agent in the solution may be selected to obtain an asymmetric modified CMS hollow fiber membrane having a $CO_2$ permeance of at least 50 GPU and a $CO_2/CH_4$ selectivity of at least 60 when subjected to a mixed feed containing 50 mol % $CO_2$ and 50 mol % $CH_4$ at 150 psi and 35° C. Alternatively, the concentration of the modifying agent in the solution may be selected to obtain an asymmetric CMS hollow fiber membrane having a $CO_2$ permeance of at least 60 GPU and a $CO_2/CH_4$ selectivity of at least 80 when subjected to a mixed feed containing 50 mol % $CO_2$ and 50 mol % $CH_4$ at 150 psi and 35° C.

Although the above examples show the manner in which the concentration of modifying agent in solution may be selected to obtain an asymmetric modified CMS hollow fiber membrane having properties that are desirable for the separation of $CO_2$ and $CH_4$, it will be understood by a person of ordinary skill in the art that by testing asymmetric modified CMS hollow fiber membranes prepared using varying concentrations of modifying agent in the separation of a different gas stream, one may readily determine the concentration (or range of concentrations) of modifying agent in the solution that produces an asymmetric modified CMS hollow fiber membrane that is particularly desirable for separation of any gas stream.

Control of the Concentration of Modifying Agent and the Pyrolysis Temperature

In various embodiments, the pyrolysis temperature is also selected to obtain an asymmetric modified CMS hollow fiber membrane having a desired combination of gas permeance and selectivity properties. The pyrolysis temperature at which a desired combination of properties is achieved will vary depending on the polymer precursor that is used. By careful control of both the concentration of modifying agent used in the pre-pyrolysis treatment and the temperature of the pyrolysis, an asymmetric modified CMS hollow fiber membrane having certain desired gas separation properties may be prepared.

To demonstrate how the gas separation properties of an asymmetric modified CMS hollow fiber membrane may be adjusted by control of both the concentration of modifying agent in the treatment step and the pyrolysis temperature, Matrimid® 5218 fibers were treated with a solution containing 10% by weight VTMS as described in Examples 10 and 11. The precursor fibers were then subjected to pyrolysis at various temperatures in order to determine the most suitable pyrolysis temperature for a selected polymer precursor that was treated with a solution comprising modifying agent at a concentration shown to yield an improved gas permeance. For comparison, untreated Matrimid® 5218 fibers and Matrimid® 5218 fibers treated with pure (i.e. 100%) VTMS were subjected to pyrolysis over a similar range of temperatures. The testing is described in more detail below.

Example 15

Matrimid® 5218 precursor fibers treated with a solution of 10 wt % VTMS as in Examples 9 and 10 were subjected to pyrolysis under an atmosphere of ultra high purity argon (99.9% pure) as follows:

1. 50° C. to 250° C. at a ramp rate of 13.3° C./min
2. 250° C. to 535° C. at a ramp rate of 3.85° C./min
3. 535° C. to 550° C. at a ramp rate of 0.25° C./min
4. Soak for 2 hours at 550° C.

The resulting modified CMS fibers were tested as described in Example 3. The permeance of $CO_2$ through the modified CMS fibers was measured to be about 190 to 195 GPU. The $CO_2/CH_4$ selectivity was determined to be about 15 to 20.

Example 16

Matrimid® 5218 precursor fibers treated with a solution of 10 wt % VTMS as in Examples 9 and 10 were subjected to pyrolysis under an atmosphere of ultra high purity argon (99.9% pure) as follows:
1. 50° C. to 250° C. at a ramp rate of 13.3° C./min
2. 250° C. to 585° C. at a ramp rate of 3.85° C./min
3. 585° C. to 600° C. at a ramp rate of 0.25° C./min
4. Soak for 2 hours at 600° C.

The resulting modified CMS fibers were tested as described in Example 3. The permeance of $CO_2$ through the modified CMS fibers was measured to be about 170 to 180 GPU. The $CO_2/CH_4$ selectivity was determined to be about 38 to 40.

Example 17

Matrimid® 5218 precursor fibers treated with a solution of 10 wt % VTMS as in Examples 9 and 10 were subjected to pyrolysis under an atmosphere of ultra high purity argon (99.9% pure) as follows:
1. 50° C. to 250° C. at a ramp rate of 13.3° C./min
2. 250° C. to 610° C. at a ramp rate of 3.85° C./min
3. 610° C. to 625° C. at a ramp rate of 0.25° C./min
4. Soak for 2 hours at 625° C.

The resulting modified CMS fibers were tested as described in Example 3. The permeance of $CO_2$ through the modified CMS fibers was measured to be about 70 to 75 GPU. The $CO_2/CH_4$ selectivity was determined to be about 75 to 80.

Comparative Example 3

Untreated Matrimid® 5218 precursor fibers were subjected to pyrolysis under an atmosphere of ultra high purity argon (99.9% pure) as follows:
1. 50° C. to 250° C. at a ramp rate of 13.3° C./min
2. 250° C. to 535° C. at a ramp rate of 3.85° C./min
3. 535° C. to 550° C. at a ramp rate of 0.25° C./min
4. Soak for 2 hours at 550° C.

The resulting CMS fibers were tested as described in Example 3. The permeance of $CO_2$ through the CMS fibers was measured to be about 20 to 30 GPU. The $CO_2/CH_4$ selectivity was determined to be about 30 to 40.

Comparative Example 4

Matrimid® 5218 precursor fibers treated with a solution of pure VTMS (100 wt %) as in Comparative Example 2 were subjected to pyrolysis under an atmosphere of ultra high purity argon (99.9% pure) as follows:
1. 50° C. to 250° C. at a ramp rate of 13.3° C./min
2. 250° C. to 535° C. at a ramp rate of 3.85° C./min
3. 535° C. to 550° C. at a ramp rate of 0.25° C./min
4. Soak for 2 hours at 550° C.

The resulting modified CMS fibers were tested as described in Example 3. The permeance of $CO_2$ through the modified CMS fibers was measured to be about 100 to 120 GPU. The $CO_2/CH_4$ selectivity was determined to be about 20 to 25.

Comparative Example 5

Matrimid® 5218 precursor fibers treated with a solution of pure VTMS (100 wt %) as in Comparative Example 2 were subjected to pyrolysis under an atmosphere of ultra high purity argon (99.9% pure) as follows:
1. 50° C. to 250° C. at a ramp rate of 13.3° C./min
2. 250° C. to 585° C. at a ramp rate of 3.85° C./min
3. 585° C. to 600° C. at a ramp rate of 0.25° C./min
4. Soak for 2 hours at 600° C.

The resulting modified CMS fibers were tested as described in Example 3. The permeance of $CO_2$ through the modified CMS fibers was measured to be about 60 to 65 GPU. The $CO_2/CH_4$ selectivity was determined to be about 30 to 35.

Figure 13:
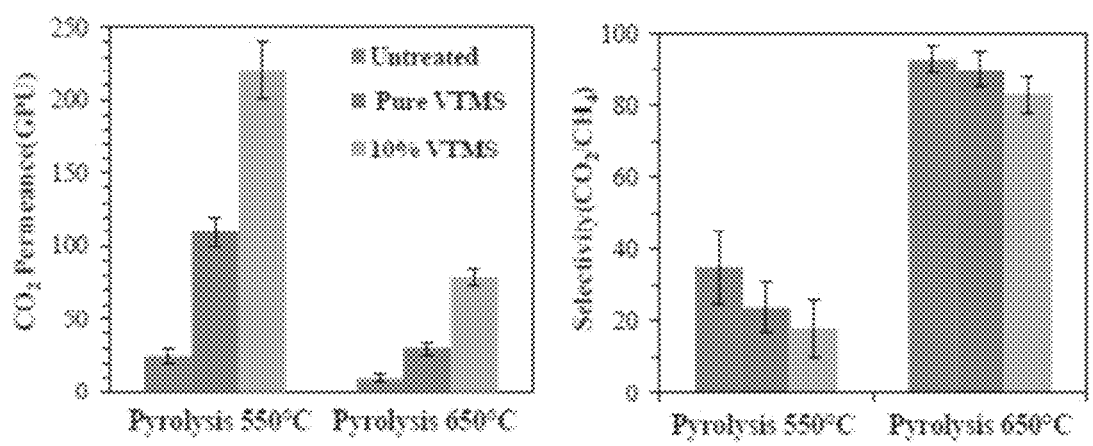
FIG. 13 is a graphical representation of test results demonstrating exemplary improved gas separation properties for asymmetric modified CMS hollow fibers prepared according to embodiments of the present invention.

The results of the testing are summarized in Table 2. Additionally, a comparison of the results at two different temperatures (550° C. and 650° C.) is shown in FIG. 13. From these results, it can be seen that in order to obtain an asymmetric modified CMS hollow fiber membrane having superior performance from a Matrimid® 5218 precursor fiber treated with a VTMS modifying agent, the precursor fiber may be contacted with a treatment solution containing about 10 wt % VTMS and then pyrolyzed at a temperature between about 600° and 650° C. Using the techniques described herein, the suitable ranges of (a) the concentration of modifying agent in the treatment solution and (b) the pyrolysis temperature could similarly be determined for any precursor fiber. For many precursor fibers, including for example polyimide precursor fibers, desirable treatment concentrations and pyrolysis temperatures are expected to be similar to those demonstrated for the Matrimid® 5218 precursor fiber.

TABLE 2

| | $P(CO_2)$ [GPU] | $CO_2/CH_4$ |
|---|---|---|
| CMS untreated Matrimid ® 5218 (Pyrolysis Temperature 550° C.) | 20-30 | 30-40 |
| CMS untreated Matrimid ® 5218 (Pyrolysis Temperature 650° C.) | 8-10 | 99-100 |
| CMS Treated (100% VTMS) Matrimid ® 5218 (Pyrolysis Temperature 550° C.) | 100-120 | 20-25 |
| CMS Treated (100% VTMS) Matrimid ® 5218 (Pyrolysis Temperature 600° C.) | 60-65 | 30-35 |
| CMS Treated (100% VTMS) Matrimid ® 5218 (Pyrolysis Temperature 650° C.) | 35-40 | 90-95 |
| CMS Treated (10% VTMS) Matrimid ® 5218 (Pyrolysis Temperature 550° C.) | 190-195 | 15-20 |
| CMS Treated (10% VTMS) Matrimid ® 5218 (Pyrolysis Temperature 600° C.) | 170-180 | 38-40 |
| CMS Treated (10% VTMS) Matrimid ® 5218 (Pyrolysis Temperature 625° C.) | 70-75 | 75-80 |
| CMS Treated (10% VTMS) Matrimid ® 5218 (Pyrolysis Temperature 650° C.) | 65-70 | 85-90 |

Although the above examples show the manner in which the concentration of modifying agent and pyrolysis temperature may together be selected to obtain an asymmetric modified CMS hollow fiber membrane having properties that are desirable for the separation of $CO_2$ and $CH_4$, it will be understood by a person of ordinary skill in the art that by testing asymmetric modified CMS hollow fiber membranes prepared using varying concentrations of modifying agent and pyrolysis temperatures for the separation of any gas stream, one may readily determine the concentration (or range of concentrations) of modifying agent and the pyrolysis temperature that produces an asymmetric modified CMS hollow fiber membrane that is particularly desirable for separation of any gas stream.

Enhanced Solvent Exchange

In various embodiments, treatment of the polymer precursor fiber may be coupled with the solvent exchange process. After the precursor fibers are formed, such as by the dry-jet, wet-quench method, the fibers are subjected to a process known as solvent exchange. In order to maintain the porosity of the fibers through drying, it is necessary to remove the water contained within the pores of the membrane. Accordingly, the solvent exchange process replaces the water that is present in the porous substructure of the fiber with an organic compound having a low surface tension. The precursor fiber is subjected to the solvent exchange process for a time that is effective to allow the organic compound to replace the water that is present in the pores of the fiber.

Solvent exchange preferably involves two or more steps, with each step using a different solvent exchange material. By way of example, a conventional solvent exchange process includes removing the water in the membrane with a first solvent and then replacing the alcohol with a second solvent. The first step uses one or more solvent exchange materials comprising a water-miscible alcohol that is sufficiently inert to the polymer. Any compound that is effective for replacing water in the membrane is contemplated for use as a first solvent. The aliphatic alcohols with 1-3 carbon atoms, i.e. methanol, ethanol, propanol, isopropanol, and combinations of the above, are particularly effective as a first solvent exchange material.

The second step is effective to replace the alcohol with one or more volatile organic compounds having a low surface tension. Any organic solvent that has a sufficiently low surface tension to prevent damage to the membrane pores during heating is contemplated for use as a second solvent. Among the organic compounds that are particularly useful as a second solvent exchange material are the $C_5$ or greater linear or branched-chain aliphatic alkanes. Toluene has also been suggested for use as a second solvent. N-hexane has been found to be a particularly suitable organic compound for use as the second solvent exchange material. Advantageously, the first and second solvent exchange materials should be sufficiently nonreactive with the membrane so as to prevent any significant degradation of membrane properties.

Although the process described in this exemplary embodiment includes only two steps, the solvent exchange process may involve any number of steps and any number of solvents. A solvent exchange process may make use of any number of solvent exchange materials, with the solvent exchange material of each subsequent step being effective to replace the solvent exchange material of the preceding step.

It has presently been found that by using a solvent exchange material that includes an amount of a modifying agent, an asymmetric modified CMS hollow fiber membrane having enhanced gas permeance may be prepared. Since treatment of a precursor fiber with a modifying agent in order to restrict the substructure collapse may be performed in association with the solvent exchange process, a modified CMS hollow fiber membrane having enhanced gas permeance may be prepared without the need for an additional process step beyond those which are typically performed in the preparation of an asymmetric CMS hollow fiber membrane. The process of treating the precursor fiber with a modifying agent, as described herein, as part of the solvent exchange step may be referred to as an enhanced solvent exchange process.

Accordingly, in various embodiments, a modifying agent is added to the second solvent in the solvent exchange process. For instance, the modifying agent is added to an organic solvent that has a sufficiently low surface tension to maintain the membrane pores during drying. In one suitable embodiment, the organic solvent is n-hexane. The concentration of the modifying agent in the organic solvent may be selected as described in this specification.

In an enhanced solvent exchange process, the precursor fiber is soaked in a solution comprising an organic compound, such as n-hexane, and a modifying agent, such as VTMS, for a period of time that is effective to allow the modifying agent to react with a portion of the water in the pores of the fiber and the organic solvent to replace another portion of the water in the pores of the fiber. In this way, the precursor fibers acquire the benefits of treatment with the modifying agent without losing the benefits of the conventional solvent exchange process.

The ability of the modifying agent to penetrate the outer skin of the asymmetric precursor fiber renders it particularly attractive for treatment of the fiber during the solvent exchange process. In a commercial process, a precursor fiber is often conveyed through the solvent exchange material in a continuous manner. Accordingly, the ends of the fiber rarely, if ever, come into contact with the solvent exchange material. Thus, for effective treatment during the commercial manufacture of an asymmetric CMS hollow fiber membrane, the modifying agent reaches the substructure of the precursor fiber through the outer skin of the fiber.

Asymmetric Modified CMS Hollow Fiber Membranes

Various embodiments of the present invention are directed to an asymmetric CMS hollow fiber membrane having a morphology stabilizer within at least one of its pores. In one desirable embodiment, the pore is a substructure pore and the morphology stabilizer is itself porous.

Example 18

Elemental analysis was performed on the following:
a. untreated Matrimid® 5218 precursor fibers,
b. Matrimid® 5218 precursor fibers treated with pure (100%) VTMS in accordance with Examples 1 and 2,
c. asymmetric CMS hollow fibers prepared by pyrolyzing untreated Matrimid® 5218 precursor fibers at 550° C. and 650° C., and
d. asymmetric modified CMS hollow fibers prepared by pyrolyzing Matrimid® 5218 precursor fibers treated with pure (100%) VTMS in accordance with Example 1 and 2 at 550° C. and 650° C.
e. asymmetric modified CMS hollow fibers prepared by pyrolyzing Matrimid® 5218 precursor fibers treated with a solution comprising 10% by weight VTMS, as set forth in Examples 9 and 10.

The elemental analysis was obtained from ALS Environmental Lab in Tucson, Arizona. The elemental analysis comprised a number of techniques to identify and measure the amount of carbon, hydrogen, nitrogen, oxygen, and silicon present in each fiber sample.

The carbon, hydrogen, and nitrogen contents were determined using a micro CHN Analysis (ASTM D5373/D5291) method. The instrument used in this method was a Perkin Elmer 2400 Series II CHN Analyzer. With this instrument, samples were combusted at 935° C., followed by a secondary combustion through the furnace at 840° C. for further oxidation and particulate removal. The gas derived from the combustion is transferred by a carrier gas, homogenized and purged through an IR detector. This detector measures carbon by $CO_2$ gas and hydrogen from $H_2O$. The nitrogen is detected by thermo conductivity in which the $NO_2$ gas from the resulting combustate is measured as nitrogen. The CHN results were then reported as a weight percent. The molar percentages of carbon, hydrogen and nitrogen were then calculated from the measured weight percentages. The samples were prepared as follows. An amount of sample, derived from the sample matrix, was weighed out on a micro-balance having a 0.0001 mg capability. Each sample was then placed into a pre-weighed, combustible tin capsule and dropped into the furnace of the instrument for analysis. The instrument was calibrated for the specific matrix of the sample and the capsule used.

The oxygen content was determined by an Oxygen Analysis (ASTM D5373, modified) method. The instrument used in this method was a LECO TruSpec Oxygen Analyzer. Each sample was put into a capsule and weighed out on a micro balance with 0.001 mg capability. The capsule was then dropped into the furnace which operates at 1300° C. In a reduction tube, broken up $O_2$ is combined with carbon black in the furnace. All $CO_x$ components are flowed through copper oxide and are converted to $CO_2$. This resulting gas is analyzed for oxygen by IR detection. The instrument was calibrated for the specific matrix of the sample and the capsule used in combustion. The results were reported as a weight percent of oxygen in the sample. The molar percentages of oxygen were then calculated from the measured weight percentages.

The content of silicon in the modified CMS hollow fiber membranes was determined by a method utilizing total dissolution. Specifically, the analysis was performed by the ICP-OES technique. This technique involves digestion of a sample with acids (such as HCl, $HNO_3$, HF) in a microwave, complexing with boric acid to neutralize HF, and bringing up to a final volume with nanopure water. The results were reported as a weight percent of silicon in the sample. The molar percentages of silicon were then calculated from the measured weight percentages.

The results of the elemental analyses are set forth in Tables 3, 4 and 5.

TABLE 3

| | Carbon (wt %) | Hydrogen (wt %) | Nitrogen (wt %) | Oxygen (wt %) | Silicon (wt %) |
|---|---|---|---|---|---|
| Untreated Matrimid® 5218 Precursor Fiber | 75.39 | 4.42 | 5.32 | 14.50 | — |
| Treated (100%) VTMS Matrimid® 5218 Precursor Fiber | 73.20 | 4.85 | 4.53 | 13.19 | 4.23 |

Elemental analysis demonstrates that the Matrimid® 5218 precursor fibers that were treated by soaking in a liquid consisting of pure VTMS contained about 4 wt % silicon. To ensure that the measured silicon is attributable to the chain-like network of siloxane bridges that are formed by the reaction of the VTMS and the moisture that resides within the pores of the asymmetric precursor hollow fiber, untreated Matrimid® 5218 precursor fibers were also subjected to elemental analysis. The untreated Matrimid® 5218 precursor fibers were found to contain no measurable amount of silicon. Accordingly, the silicon found by elemental analysis of the treated Matrimid® 5218 precursor fibers can serve to indicate the amount of chain-linked modifying agent condensate that resides in a precursor fiber after treatment.

TABLE 4

| | Carbon (wt %) | Hydrogen (wt %) | Nitrogen (wt %) | Oxygen (wt %) | Silicon (wt %) |
|---|---|---|---|---|---|
| Untreated | | | | | |
| CMS untreated Matrimid® 5218 (Pyrolysis Temperature 550° C.) | 87.37 | 3.09 | 4.8 | 4.8 | — |
| CMS untreated Matrimid® 5218 (Pyrolysis Temperature 650° C.) | 91.19 | 1.27 | 3.78 | 2.67 | — |
| Treated (100% VTMS) | | | | | |
| CMS Treated (100% VTMS) Matrimid® 5218 (Pyrolysis Temperature 550° C.) | 76.06 | 3.24 | 3.96 | 5.17 | 11.56 |
| CMS Treated (100% VTMS) Matrimid® 5218 (Pyrolysis Temperature 650° C.) | 76.34 | 2.35 | 2.69 | 2.99 | 15.63 |
| Treated (10% VTMS) | | | | | |
| CMS Treated (10% VTMS) Matrimid® 5218 (Pyrolysis Temperature 550° C.) | 85.60 | 3.36 | 3.91 | 2.95 | 4.19 |
| CMS Treated (10% VTMS) Matrimid® 5218 (Pyrolysis Temperature 600° C.) | 87.64 | 2.73 | 3.35 | 1.98 | 4.30 |
| CMS Treated (10% VTMS) Matrimid® 5218 (Pyrolysis Temperature 650° C.) | 86.05 | 2.47 | 3.09 | 2.57 | 5.82 |

Elemental analysis was also performed on asymmetric modified CMS hollow fibers that were prepared by treating Matrimid® 5218 precursor fibers with pure VTMS and then pyrolyzing the treated fibers. The results indicate that the modified CMS hollow fibers contain between about 11 wt % silicon and about 16 wt % silicon (between about 3 and about 6 mol % silicon), depending on the pyrolysis temperature (which ranged from 550° C. to 650° C.). To ensure that the measured silicon was attributable to the morphology stabilizer that is present after pyrolysis, CMS hollow fibers prepared by pyrolyzing untreated Matrimid® 5218 precursor fibers (using the same pyrolysis temperatures) were also subjected to elemental analysis. The CMS hollow fibers prepared from untreated Matrimid® 5218 precursor fibers were found to contain no measurable amount of silicon. Accordingly, the weight percent of silicon found by elemental analysis of modified CMS hollow fibers can serve to indicate the amount of morphology stabilizer that resides in an asymmetric modified CMS hollow fiber membrane.

Next, elemental analysis was performed on asymmetric modified CMS hollow fibers that were prepared by treating Matrimid® 5218 precursor fibers with a solution containing 10% by weight VTMS, and then pyrolyzing the treated fibers at different pyrolysis temperatures ranging from 550° C. to 650° C. The modified CMS hollow fiber membranes were found to contain between about 4% by weight silicon and about 6% by weight silicon (between about 1 and about 2 mol % silicon).

TABLE 5

| | Carbon (mol %) | Hydrogen (mol %) | Nitrogen (mol %) | Oxygen (mol %) | Silicon (mol %) |
|---|---|---|---|---|---|
| Untreated | | | | | |
| CMS untreated Matrimid ® (Pyrolysis Temperature 550° C.) | 66.11 | 28.06 | 3.11 | 2.72 | — |
| CMS untreated Matrimid ® (Pyrolysis Temperature 650° C.) | 81.66 | 13.65 | 2.90 | 1.79 | — |
| Treated (100% VTMS) | | | | | |
| CMS Treated (100% VTMS) Matrimid ® (Pyrolysis Temperature 550° C.) | 56.17 | 35.55 | 2.29 | 2.36 | 3.62 |
| CMS Treated (100% VTMS) Matrimid ® (Pyrolysis Temperature 650° C.) | 65.96 | 24.34 | 1.99 | 1.94 | 5.77 |
| Treated (10% VTMS) | | | | | |
| CMS Treated (10% VTMS) Matrimid ® (Pyrolysis Temperature 550° C.) | 64.21 | 30.28 | 2.51 | 1.66 | 1.34 |
| CMS Treated (10% VTMS) Matrimid ® (Pyrolysis Temperature 600° C.) | 69.22 | 25.88 | 2.27 | 1.17 | 1.45 |
| CMS Treated (10% VTMS) Matrimid ® (Pyrolysis Temperature 650° C.) | 70.08 | 24.17 | 2.16 | 1.57 | 2.03 |

In one embodiment, the asymmetric modified CMS hollow fiber membrane comprises an amount of morphology stabilizer that can be determined by elemental analysis, such that the asymmetric modified CMS hollow fiber membrane comprises a desired molar percentage of an element whose only significant presence in the fiber is attributable to treatment with a modifying agent, i.e. an indicating element. The indicating element comprises, for example, silicon and/or the metal element that forms the head of the silane and/or metal alkoxide modifying agents. For example, the asymmetric modified CMS hollow fiber membrane may comprise between about 0.1 mol % and about 10 mol % of the indicating element; alternatively between about 0.1 mol % and about 8 mol %; alternatively between about 0.1 mol % and about 7 mol %; alternatively between about 0.1 mol % and about 6 mol %; alternatively between about 0.1 mol % and about 5 mol %; alternatively between about 0.1 mol % and about 4 mol %; alternatively between about 0.1 mol % and about 3 mol %; alternatively between about 0.1 mol % and about 2 mol %; alternatively between about 0.5 mol % and about 10 mol %; alternatively between about 0.5 mol % and about 8 mol %; alternatively between about 0.5 mol % and about 7 mol %; alternatively between about 0.5 mol % and about 6 mol %; alternatively between about 0.5 mol % and about 5 mol %; alternatively between about 0.5 mol % and about 4 mol %; alternatively between about 0.5 mol % and about 3 mol %; alternatively between about 0.5 mol % and about 2 mol %; alternatively between about 0.75 mol % and about 10 mol %; alternatively between about 0.75 mol % and about 8 mol %; alternatively between about 0.75 mol % and about 7 mol %; alternatively between about 0.75 mol % and about 6 mol %; alternatively between about 0.75 mol % and about 5 mol %; alternatively between about 0.75 mol % and about 4 mol %; alternatively between about 0.75 mol % and about 3 mol %; alternatively between about 0.75 mol % and about 2 mol %; alternatively between about 1 mol % and about 10 mol %; alternatively between about 1 mol % and about 8 mol %; alternatively between about 1 mol % and about 7 mol %; alternatively between about 1 mol % and about 6 mol %; alternatively between about 1 mol % and about 5 mol %; alternatively between about 1 mol % and about 4 mol %; alternatively between about 1 mol % and about 3 mol %; alternatively between about 1 mol % and about 2 mol %.

Advantageously, the asymmetric modified CMS hollow fiber membrane may comprise an amount of morphology stabilizer such that the asymmetric modified CMS hollow fiber membrane comprises a desired weight percentage of indicating element. For example, in embodiments where the morphology stabilizer comprises a silicon-containing compound, the asymmetric modified CMS hollow fiber membrane may comprise between about 0.1 wt % and about 20 wt % silicon; alternatively between about 0.1 wt % and about 15 wt %; alternatively between about 0.1 wt % and about 10 wt %; alternatively between about 0.1 wt % and about 8 wt %; alternatively between about 0.1 wt % and about 6 wt %; alternatively between about 0.1 wt % and about 5 wt %; alternatively between about 0.5 wt % and about 20 wt % silicon; alternatively between about 0.5 wt % and about 15 wt %; alternatively between about 0.5 wt % and about 10 wt %; alternatively between about 0.5 wt % and about 8 wt %; alternatively between about 0.5 wt % and about 6 wt %; alternatively between about 0.5 wt % and about 5 wt %; alternatively between about 1 wt % and about 20 wt % silicon; alternatively between about 1 wt % and about 15 wt %; alternatively between about 1 wt % and about 10 wt %; alternatively between about 1 wt % and about 8 wt %; alternatively between about 1 wt % and about 6 wt %; alternatively between about 1 wt % and about 5 wt %; alternatively between about 2 wt % and about 20 wt % silicon; alternatively between about 2 wt % and about 15 wt %; alternatively between about 2 wt % and about 10 wt %; alternatively between about 2 wt % and about 8 wt %; alternatively between about 2 wt % and about 6 wt %; alternatively between about 2 wt % and about 5 wt %; alternatively between about 3 wt % and about 20 wt % silicon; alternatively between about 3 wt % and about 15 wt %; alternatively between about 3 wt % and about 10 wt %; alternatively between about 3 wt % and about 8 wt %;

alternatively between about 3 wt % and about 6 wt %; alternatively between about 3 wt % and about 5 wt %; alternatively between about 4 wt % and about 20 wt % silicon; alternatively between about 4 wt % and about 15 wt %; alternatively between about 4 wt % and about 10 wt %; alternatively between about 4 wt % and about 8 wt %; alternatively between about 4 wt % and about 6 wt %.

In various embodiments, a precursor fiber may comprise a layer of modifying agent reaction product on the outer skin of the fiber and an asymmetric modified CMS hollow fiber membrane may comprise a layer of residual modifying agent reaction product. For example, a precursor fiber that is treated with modifying agent may comprise a layer of silicon-containing material on the outer skin of the fiber. Similarly, the asymmetric modified CMS hollow fiber membrane may comprise a layer of a residual silicon-containing material on the outer skin of the fiber. Alternatively, where a metal-containing modifying agent is used in the pre-pyrolysis treatment of the precursor fiber, the treated precursor fiber may comprise a layer of metal-containing material on the outer skin of the fiber and the asymmetric modified CMS hollow fiber membrane may comprise a layer of residual metal-containing material on the outer skin of the fiber.

The layer of modifying agent reaction product provides the treated precursor fibers with a non-stick property that is desirable for the pyrolysis of fibers in bunches. Thus, embodiments of the present invention are directed to a precursor polymer fiber comprising a mechanical barrier layer that prevents the precursor fiber from sticking to other precursor fibers when the fibers are heated to a temperature above the glass transition temperature of the polymer material.

Embodiments of the present invention are also directed to bundles of asymmetric modified CMS hollow fibers, wherein the modified CMS hollow fibers are substantially free from sticking to one another after pyrolysis. The modified CMS hollow fibers preferably comprise a layer of residual modifying agent reaction product, such as a silica material, on the outer skin surface. As described earlier, however, it is preferred that the layer of residual modifying agent reaction product on a modified CMS hollow fiber membrane be thin in order to minimize interference with gas flow through the outer skin of the asymmetric modified CMS hollow fiber membrane.

Examples 19 to 70

The procedure of Example 7 was carried out using a number of different precursor polymers and modifying agents. As noted, additional polymers contemplated for use include:
P1. 6FDA:BPDA-DAM
P2. 6FDA:BTDA-DAM
P3. 6FDA:DSDA-DAM
P4. 6FDA:ODPA-DAM
As noted, suitable modifying agents may include
M1. vinyl triethoxy silane
M2. vinyl tripropoxy silane
M3. vinyl tributoxy silane
M4. divinyl dimethoxysilane
M5. divinyl diethoxysilane
M6. tetra methoxy titanium
M7. titanium methoxypropoxide
M8. tetrapropoxy titanium
M9. tetraethoxy titanium
M10. tetra methoxy vanadium
M11. vanadium methoxypropoxide
M12. tetrapropoxy vanadium
M13. tetraethoxy vanadium

| Example No. | Precursor Polymer | Modifying agent |
|---|---|---|
| 19 | P1 | M1 |
| 20 | P1 | M2 |
| 21 | P1 | M3 |
| 22 | P1 | M4 |
| 23 | P1 | M5 |
| 24 | P1 | M6 |
| 25 | P1 | M7 |
| 26 | P1 | M8 |
| 27 | P1 | M9 |
| 28 | P1 | M10 |
| 29 | P1 | M11 |
| 30 | P1 | M12 |
| 31 | P1 | M13 |
| 32 | P2 | M1 |
| 33 | P2 | M2 |
| 34 | P2 | M3 |
| 35 | P2 | M4 |
| 36 | P2 | M5 |
| 37 | P2 | M6 |
| 38 | P2 | M7 |
| 39 | P2 | M8 |
| 40 | P2 | M9 |
| 41 | P2 | M10 |
| 42 | P2 | M11 |
| 43 | P2 | M12 |
| 44 | P2 | M13 |
| 45 | P3 | M1 |
| 46 | P3 | M2 |
| 47 | P3 | M3 |
| 48 | P3 | M4 |
| 49 | P3 | M5 |
| 50 | P3 | M6 |
| 51 | P3 | M7 |
| 52 | P3 | M8 |
| 53 | P3 | M9 |
| 54 | P3 | M10 |
| 55 | P3 | M11 |
| 56 | P3 | M12 |
| 57 | P3 | M13 |
| 58 | P4 | M1 |
| 59 | P4 | M2 |
| 60 | P4 | M3 |
| 61 | P4 | M4 |
| 62 | P4 | M5 |
| 63 | P4 | M6 |
| 64 | P4 | M7 |
| 65 | P4 | M8 |
| 66 | P4 | M9 |
| 67 | P4 | M10 |
| 68 | P4 | M11 |
| 69 | P4 | M12 |
| 70 | P4 | M13 |

Treatment of Thermally Re-Arranged Polymer Membranes

The pores and channels within a polymer film or fiber typically have a wide range of sizes, which render the polymer structures generally unsuitable for gas separation applications. In various embodiments, pyrolysis of a polymer material forms a carbon molecular sieve material having ordered pores. However, certain polymers may be treated to render the polymer itself suitable for gas separation applications. Thermally re-arranged polymer membranes, also known as TR polymer membranes or TR polymer fibers, remedy the problem of variable pore sizes by thermally driving spatial rearrangement of rigid polymer chain segments in the glassy phase in order to produce pores having a more controlled size. These changes in the polymer structure are said to increase permeability and selectivity properties, rendering the polymer suitable for gas separation.

Preferred thermally re-arranged polymer membranes comprise aromatic polymers that are interconnected with heterocyclic rings. Examples include polybenzoxazoles, polybenzothiazoles, and polybenzimidazoles. Preferred thermally re-arranged polymer precursors comprise polyimides with ortho-positioned functional groups, such as for example HAB-6FDA, a polyimide having the following structure.

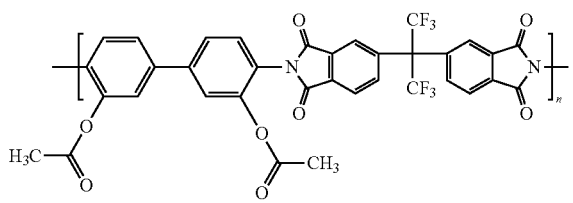

The phenylene-heterocyclic ring units in such materials have rigid chain elements and a high-torsional energy barrier to rotation between the two rings, which prevents indiscriminant rotation. Thermal re-arrangement of these polymers can thus be controlled to create pores having a narrow size distribution, rendering them useful for gas separation applications.

The temperature at which the thermal rearrangement occurs is generally lower than the temperatures used for pyrolysis, as pyrolysis would convert the polymer fiber into a carbon fiber. Polyimides, for example, are typically heated to a temperature between about 250° C. and about 500° C., more preferably between about 300° C. and about 450°. The heating of the polymers generally takes place in an inert atmosphere for a period of a number of hours. Although the polymer is not subjected to the same stresses of pyrolysis, heating of the polymer at a temperature sufficient to cause thermal re-arrangement also results in undesirable pore collapse.

Accordingly, embodiments of the present invention are directed to the treatment of a polymer material with a modifying agent prior to thermal-rearrangement, wherein the treatment is effective to restrict the undesirable pore collapse of the thermally re-arranged polymer material. Treatment of the polymer material is performed in the same manner described above with respect to treatment of polymer precursor fibers that are then pyrolyzed to form asymmetric CMS hollow fiber membranes. The difference being, of course, that the treated polymer material is subjected to thermal re-arrangement, as is known in the art, as opposed to pyrolysis. Embodiments of the present invention are also directed to a thermally re-arranged polymer material having a restricted pore collapse, such as one that is treated with a modifying agent as described herein.

It can be seen that the described embodiments provide unique and novel treatment processes, asymmetric modified CMS hollow fiber membranes, and thermally re-arranged polymer membranes that have a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A process for preparing a thermally rearranged polymer material having improved gas separation performance properties comprising:
    a. providing a polymer precursor material comprising a polyimide with an ortho-positioned functional group,
    b. contacting the polymer precursor material with a solution comprising a modifying agent and a non-aqueous solvent, wherein the modifying agent is
        a compound having the general formula $R^1R^2R^3R^4Si$, where each of $R^1$, $R^2$, $R^3$, and $R^4$ are independently $C_1$-$C_6$ alkyl or alkenyl, alkoxy, or halogen; with the proviso that the compound contains at least one $C_1$-$C_6$ alkyl or alkenyl substituent and at least one alkoxy or halogen substituent, or
        a compound having the general formula $R^1R^2R^3R^4M$, where M is a metal and where each of $R^1$, $R^2$, $R^3$, and $R^4$ are independently $C_1$-$C_6$ alkyl or alkenyl, alkoxy, or halogen, with the proviso that the compound contains at least one $C_1$-$C_6$ alkyl or alkenyl substituent and at least one alkoxy or halogen substituent,
    c. contacting the polymer precursor material of step b. with a moisture-containing atmosphere to form a treated polymer precursor material, and
    d. heating the treated polymer precursor material to form a thermally rearranged polymer.

2. The process of claim 1, wherein the modifying agent comprises between about 1 wt % and about 95 wt % of the solution.

3. The process of claim 2, wherein the modifying agent comprises between about 1 wt % and about 50 wt % of the solution.

4. The process of claim 3, wherein the modifying agent comprises between about 5 wt % and about 25 wt % of the solution.

5. The process of claim 1, wherein the modifying agent is a compound having the general formula $R^1R^2R^3R^4Si$, where each of $R^1$, $R^2$, $R^3$, and $R^4$ are independently $C_1$-$C_6$ alkyl or alkenyl, alkoxy, or halogen; with the proviso that the compound contains at least one $C_1$-$C_6$ alkyl or alkenyl substituent and at least one alkoxy or halogen substituent.

6. The process of claim 5, wherein the modifying agent is vinyl trimethoxy silane.

7. The process of claim 1, wherein the modifying agent is a compound having the general formula $R^1R^2R^3R^4M$, where M is a metal and where each of $R^1$, $R^2$, $R^3$, and $R^4$ are independently $C_1$-$C_6$ alkyl or alkenyl, alkoxy, or halogen, with the proviso that the compound contains at least one $C_1$-$C_6$ alkyl or alkenyl substituent and at least one alkoxy or halogen substituent.

8. The process of claim 7, where M is selected from the group consisting of Ge, B, Al, Ti, V, Fe, and combinations thereof.

9. The process of claim 1, wherein the non-aqueous solvent comprises a $C_5$ or greater, linear or branched-chain aliphatic hydrocarbon.

10. The process of claim 9, wherein the $C_5$ or greater linear or branched-chain aliphatic hydrocarbon is n-hexane.

11. The process of claim 1, wherein the solution comprises vinyl trimethoxy silane and n-hexane.

12. The process of claim 1, wherein the thermally rearranged polymer comprises polybenzoxazoles, polybenzothiazoles, polybenzimidazoles, or a combination thereof.

13. The process of claim 1, wherein the treated polymer precursor material is heated to a temperature between about 250 and about 500° C. to form a thermally rearranged polymer.

14. The process of claim 13, wherein the treated polymer precursor material is heated to a temperature between about 300 and about 450° C. to form a thermally rearranged polymer.

15. The process of claim 13, wherein the treated polymer precursor material is heated under an inert atmosphere to form a thermally rearranged polymer.

16. The process of claim 1, wherein the concentration of the modifying agent in the solution is selected to obtain a thermally rearranged polymer having a gas permeance property that is at least a 300% increase over an equivalent thermally rearranged polymer that is not subjected to the treatment of steps b. and c.

17. The process of claim 16, wherein the concentration of the modifying agent in the solution is selected to obtain a thermally rearranged polymer having a selectivity that is at least 85% of the selectivity of an equivalent thermally rearranged polymer that is not subjected to the treatment of steps b. and c.

18. The process of claim 1, wherein the concentration of the modifying agent in the solution is selected to obtain a thermally rearranged polymer that is useful for the separation of gases selected from the group consisting of $CO_2$ and $CH_4$, $H_2S$ and $CH_4$, $CO_2/H_2S$ and $CH_4$, $CO_2$ and $N_2$, $O_2$ and $N_2$, $N_2$ and $CH_4$, He and $CH_4$, $H_2$ and $CH_4$, $H_2$ and $C_2H_4$, ethylene and ethane, propylene and propane, and ethane/propane and ethylene/propylene.

19. The process of claim 1, wherein the concentration of the modifying agent in the solution is selected to obtain a thermally rearranged polymer that is useful for the separation of acid gases from a natural gas stream.

20. The process of claim 1, wherein the concentration of the modifying agent in the solution is selected to obtain a thermally rearranged polymer that is useful for the separation of $CO_2$ from a hydrocarbon-containing gas stream.

* * * * *